United States Patent
Yuki et al.

(10) Patent No.: US 11,228,822 B2
(45) Date of Patent: Jan. 18, 2022

(54) TRANSMISSION SYSTEM, TRANSMISSION DEVICE, AND TRANSMISSION METHOD

(71) Applicant: FUJITSU LIMITED, Kawasaki (JP)

(72) Inventors: Masahiro Yuki, Kawasaki (JP); Shingo Hara, Kawasaki (JP); Takeshi Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/130,357

(22) Filed: Dec. 22, 2020

(65) Prior Publication Data

US 2021/0112320 A1 Apr. 15, 2021

Related U.S. Application Data

(62) Division of application No. 16/687,813, filed on Nov. 19, 2019, now Pat. No. 10,904,648.

(30) Foreign Application Priority Data

Nov. 27, 2018 (JP) .............................. JP2018-221400

(51) Int. Cl.
*H04J 14/00* (2006.01)
*H04Q 11/00* (2006.01)
*G02F 1/35* (2006.01)

(52) U.S. Cl.
CPC ..... *H04Q 11/0005* (2013.01); *H04Q 11/0062* (2013.01); *G02F 1/353* (2013.01);
(Continued)

(58) Field of Classification Search
CPC ........... H04Q 11/0005; H04Q 11/0062; H04Q 2011/0011; H04Q 2011/0088;
(Continued)

(56) References Cited

U.S. PATENT DOCUMENTS 6,094,442 A 7/2000 Okamoto et al.
6,115,173 A * 9/2000 Tanaka ............... H04B 10/2935
359/333
(Continued)

FOREIGN PATENT DOCUMENTS

EP 1008898 A1 6/2000
EP 2161866 A1 3/2010
(Continued)

OTHER PUBLICATIONS

USPTO, (Sanchez) Notice of Allowance Oct. 5, 2020, in parent U.S. Appl. No. 16/687,813 [pending].
(Continued)

*Primary Examiner* — Dibson J Sanchez
(74) *Attorney, Agent, or Firm* — Fujitsu Patent Center

(57) ABSTRACT

A transmission device, includes a first wavelength converter configured to convert a second wavelength-multiplexed signal in a first wavelength band to a second wavelength band different from the first wavelength band, and a multiplexer configured to transmit, after the conversion, a wavelength-multiplexed signal obtained through multiplexing of a first wavelength-multiplexed signal in the first wavelength band, a first supervisory control signal light ray that is a control signal for the first wavelength-multiplexed signal, the second wavelength-multiplexed signal in the second wavelength band, and a second supervisory control signal light ray that is a control signal for the second wavelength-multiplexed signal, wherein the first supervisory control signal light ray and the second supervisory control signal light ray each have a wavelength in a wavelength band different from the first wavelength band and the second wavelength band.

8 Claims, 10 Drawing Sheets

(52) U.S. Cl.
CPC ....... *H04J 14/00* (2013.01); *H04Q 2011/0011* (2013.01); *H04Q 2011/0088* (2013.01); *H04Q 2213/13295* (2013.01); *H04Q 2213/172* (2013.01)

(58) Field of Classification Search
CPC .... H04Q 2213/13295; H04Q 2213/172; G02F 1/353; H04J 14/00; H04J 14/0261; H04J 14/0227; H04J 14/0202; H04B 10/077
USPC .......................................... 398/9–38, 43–103
See application file for complete search history.

(56) References Cited

U.S. PATENT DOCUMENTS

| | | |
|---|---|---|
| 6,259,555 B1 | 7/2001 | Meli et al. |
| 6,292,289 B1 | 9/2001 | Sugaya et al. |
| 6,449,070 B1 | 9/2002 | Izumi |
| 6,501,597 B1 | 12/2002 | Pitt et al. |
| 6,509,987 B1 | 1/2003 | Hunziker et al. |
| 6,614,567 B1 | 9/2003 | Al-Salameh et al. |
| 6,819,875 B2 | 11/2004 | Touma |
| 6,871,021 B2 | 3/2005 | Graves et al. |
| 6,885,499 B1 | 4/2005 | Hoshida et al. |
| 6,980,743 B1 | 12/2005 | Greene |
| 7,409,155 B2 | 8/2008 | Takahashi |
| 7,831,118 B2 | 11/2010 | Oikawa et al. |
| 8,606,115 B2 | 12/2013 | Onaka |
| 8,886,032 B2* | 11/2014 | Tominaga ........... H04J 14/0297 398/7 |
| 10,782,589 B2 | 9/2020 | Takeyama et al. |
| 2001/0033412 A1 | 10/2001 | Gurnari et al. |
| 2002/0101635 A1 | 8/2002 | Taketomi |
| 2002/0114060 A1* | 8/2002 | Kobayashi ......... H04B 10/0777 359/334 |
| 2002/0118415 A1* | 8/2002 | Dasylva ................. H04J 14/02 398/48 |
| 2002/0141008 A1 | 10/2002 | Chbat et al. |
| 2002/0154359 A1 | 10/2002 | Tsuda et al. |
| 2002/0163689 A1 | 11/2002 | Aso et al. |
| 2004/0001715 A1 | 1/2004 | Katagiri et al. |
| 2004/0004756 A1 | 1/2004 | Hainberger et al. |
| 2004/0042063 A1 | 3/2004 | Ohtani et al. |
| 2004/0141229 A1* | 7/2004 | Kakui ................. H01S 3/06716 359/342 |
| 2004/0184807 A1 | 9/2004 | Aso et al. |
| 2005/0041968 A1 | 2/2005 | Takahashi |
| 2005/0213967 A1 | 9/2005 | Okano et al. |
| 2006/0140626 A1 | 6/2006 | Robinson et al. |
| 2006/0216028 A1 | 9/2006 | Ozawa |
| 2009/0195862 A1 | 8/2009 | Kondoh et al. |
| 2011/0317997 A1* | 12/2011 | Satou ................. H04B 10/0771 398/20 |
| 2015/0043907 A1 | 2/2015 | Cavaliere et al. |
| 2016/0065305 A1 | 3/2016 | Endo et al. |
| 2017/0307957 A1 | 10/2017 | Kato et al. |
| 2017/0359127 A1* | 12/2017 | Moeller ............. H04B 10/2569 |
| 2019/0222345 A1 | 7/2019 | Karube et al. |
| 2019/0346738 A1 | 11/2019 | Takeyama et al. |
| 2019/0349113 A1 | 11/2019 | Komiya et al. |
| 2019/0353980 A1 | 11/2019 | Shukunami et al. |
| 2019/0386767 A1 | 12/2019 | Yuki et al. |
| 2020/0059313 A1 | 2/2020 | Kato et al. |
| 2020/0153502 A1* | 5/2020 | Buset ..................... H04B 10/03 |

FOREIGN PATENT DOCUMENTS

| | | |
|---|---|---|
| EP | 3618318 A1 | 3/2020 |
| JP | 2003-188830 A | 7/2003 |
| WO | 2018/198478 A1 | 11/2018 |

OTHER PUBLICATIONS

USPTO, (Sanchez) Requirement for Restriction/Election, Jul. 21, 2020 in parent U.S. Appl. No. 16/087,813 [pending].
EESR—Extended European Search Report of European Paten Applicalion No. 19208262.6 dated Apr. 23, 2020.
CNOA—Chinese Office Action dated Jun. 3, 2021 for corresponding Chinese Patent Application No. 201911165921.2 with English Translation. Reference WO2018/198478A1 cited in the CNOA was previously submitted in the IDS filed on Dec. 22, 2020.

* cited by examiner

US 11,228,822 B2

TRANSMISSION SYSTEM, TRANSMISSION DEVICE, AND TRANSMISSION METHOD

CROSS-REFERENCE TO RELATED APPLICATION

This application is a divisional of application Ser. No. 16/687,813, filed Nov. 19, 2019, which is based upon and claims the benefit of priority of the prior Japanese Patent Application No. 2018-221400, filed on Nov. 27, 2018, the entire contents of which are incorporated herein by reference.

FIELD

The embodiments discussed herein are related to a transmission system, a transmission device, and a transmission method.

BACKGROUND

Along with an increase in demand for communication, the transmission capacity of wavelength division multiplexing (WDM) has been demanded to be increased. In a case where transmission is made only with wavelength-multiplexed signal light ray in the conventional (C) band, for example, the wavelength band is limited to 1,530 to 1,565 (nm).

It is accordingly considered to expand the wavelength band to the long (L) band of from 1,565 to 1,625 (nm) or the short (S) band of from 1,460 to 1,530 (nm), for example, to thereby increase the transmission capacity of WDM. For example, Japanese Laid-open Patent Publication No. 2003-188830 describes a technology that converts a C-band wavelength-multiplexed signal light ray to L-band and S-band wavelength-multiplexed signal light rays, and multiplexes the C-band, L-band, and S-band wavelength-multiplexed signal light rays to transmit the resultant.

SUMMARY

According to an aspect of the embodiment, A transmission device, includes a first wavelength converter configured to convert a second wavelength-multiplexed signal in a first wavelength band to a second wavelength band different from the first wavelength band, and a multiplexer configured to transmit, after the conversion, a wavelength-multiplexed signal obtained through multiplexing of a first wavelength-multiplexed signal in the first wavelength band, a first supervisory control signal light ray that is a control signal for the first wavelength-multiplexed signal, the second wavelength-multiplexed signal in the second wavelength band, and a second supervisory control signal light ray that is a control signal for the second wavelength-multiplexed signal, wherein the first supervisory control signal light ray and the second supervisory control signal light ray each have a wavelength in a wavelength band different from the first wavelength band and the second wavelength band.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

To the C-band, L-band, and S-band wavelength-multiplexed signal light rays, supervisory control signal light rays containing supervisory control information on the respective wavelength-multiplexed signal light rays are multiplexed. The control information is, for example, a notification of transmission path disconnection, and in response to the notification of transmission path disconnection, for example, an optical amplifier on the transmission path stops light emission. With this, the laser light hardly leaks from the transmission path, and hence the safety of a worker or the like near the transmission path is secured.

On the transmission side, the wavelength-multiplexed signal light ray of a main signal light ray including a main signal and the supervisory control signal light ray are multiplexed, and the wavelength band of the thus obtained multiplexed light ray is converted from the C band to the S band or the L band. The wavelength conversion is possible within a limited bandwidth, and hence as the wavelength bandwidth of the supervisory control signal light ray is widened, the wavelength bandwidth of the main signal light ray is narrowed, resulting in a reduction in amount of data that a user may transmit. In contrast to this, as the wavelength bandwidth of the main signal light ray is widened, the wavelength bandwidth of the supervisory control signal light ray is narrowed, resulting in a reduction in amount of data usable for a supervisory control function.

It is desirable to provide a transmission system, a transmission device, and a transmission method capable of decreasing a reduction in wavelength bandwidth of the main signal light ray and the supervisory control signal light ray.

Comparative Example

Figure 1:
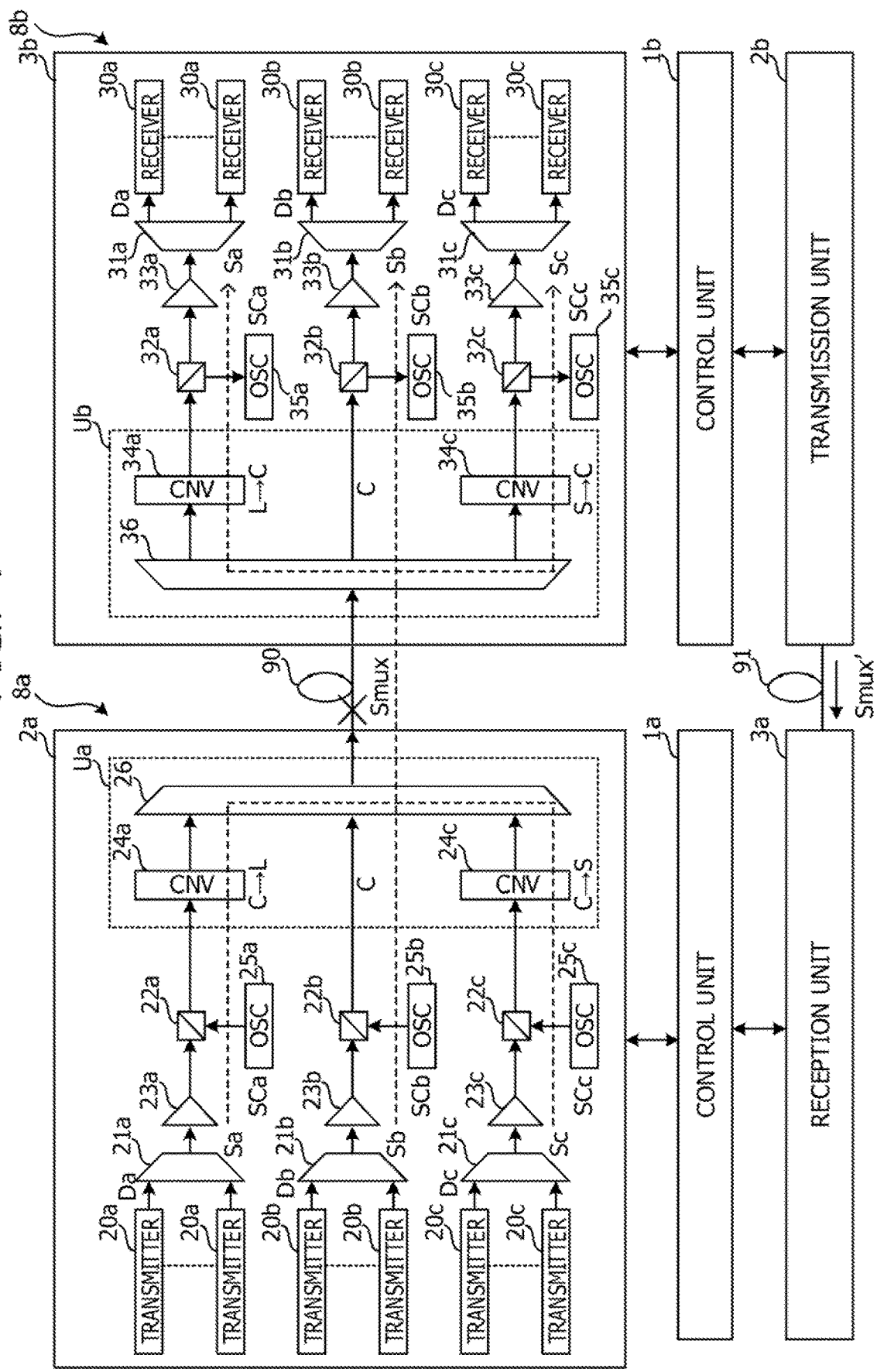
FIG. 1 is a configuration diagram illustrating a transmission system of a comparative example.

FIG. 1 is a configuration diagram illustrating a transmission system of a comparative example. The transmission system includes a pair of transmission devices 8a and 8b coupled to each other through transmission paths 90 and 91 including optical fibers, for example.

The transmission device 8a Includes a control unit 1a, a transmission unit 2a, and a reception unit 3a, while the transmission device 8b includes a control unit 1b, a transmission unit 2b, and a reception unit 3b. The transmission unit 2a and the reception unit 3b are coupled to each other through the transmission path 90, while the transmission unit 2b and the reception unit 3a are coupled to each other through the transmission path 91.

As indicated by the dotted line, the transmission unit 2a multiplexes C-band, L-band, and S-band wavelength-multiplexed signal light rays Sa to Sc to generate a multiplexed light ray Smux, and transmits the multiplexed light ray Smux to the reception unit 3b through the transmission path 90. Similar to the transmission unit 2a, the transmission unit 2b multiplexes C-band, L-band, and S-band wavelength-multiplexed signal light rays to generate a multiplexed light ray Smux', and transmits the multiplexed light ray Smux' to the reception unit 3a through the transmission path 91.

The control units 1a and 1b, the transmission units 2a and 2b, and the reception units 3a and 3b each include, for example, a circuit board having mounted thereon a plurality of electrical components and optical components, and are mounted in their respective slots provided in the casings of the transmission devices 8a and 8b. The control units 1a and 1b, the transmission units 2a and 2b, and the reception units 3a and 3b are coupled to wiring substrates provided in the transmission devices 8a and 8b through, for example, electrical connectors, and input/output data from/to each other through the wiring substrates.

The configurations of the transmission unit 2a and the reception unit 3b are now described. The transmission unit 2b has a configuration similar to that of the transmission unit 2a, and the reception unit 3a has a configuration similar to that of the reception unit 3b.

The transmission unit 2a includes a plurality of transmitters 20a to 20c, multiplexers 21a to 21c and 22a to 22c, optical amplifiers 23a to 23c, OSC transmission units 25a to 25c, and an optical transmission processing unit Ua. The optical transmission processing unit Ua includes wavelength conversion units (CNV) 24a and 24c and a multiplexer 26.

The wavelength conversion unit 24a converts the wavelength band of the wavelength-multiplexed signal light ray Sa from the C band to the L band, and the wavelength conversion unit 24c converts the wavelength band of the wavelength-multiplexed signal light ray Sc from the C band to the S band. The C band is an example of a first wavelength band, and the S band and the L band correspond to an example of a second wavelength band.

The plurality of transmitters 20a, the multiplexers 21a and 22a, the optical amplifier 23a, and the wavelength conversion unit 24a are provided on the path of the wavelength-multiplexed signal light ray Sa. Each of the transmitters 20a generates a main signal light ray Da having a wavelength in the C band and outputs the main signal light ray Da to the multiplexer 21a.

The plurality of transmitters 20b, the multiplexers 21b and 22b, and the optical amplifier 23b are provided on the path of the wavelength-multiplexed signal light ray Sb. Each of the transmitters 20b generates a main signal light ray Db having a wavelength in the C band and outputs the main signal light ray Db to the multiplexer 21b.

The plurality of transmitters 20c, the multiplexers 21c and 22c, and the optical amplifier 23c are provided on the path of the wavelength-multiplexed signal light ray Sc. Each of the transmitters 20c generates a main signal light ray Dc having a wavelength in the C band and outputs the main signal light ray Dc to the multiplexer 21c. The transmitters 20a to 20c are coupled to, for example, a local area network (LAN) on the client side, and generate the main signal light rays Da to Dc from client signals, for example, Ethernet (registered trademark; the same applies hereinafter) signals.

The multiplexer 21a multiplexes the main signal light rays Da input from the respective transmitters 20a to generate the C-band wavelength-multiplexed signal light ray Sa, and outputs the C-band wavelength-multiplexed signal light ray Sa to the optical amplifier 23a. Similar to the multiplexer 21a, the multiplexer 21b generates the C-band wavelength-multiplexed signal light ray Sb from the main signal light rays Db and outputs the C-band wavelength-multiplexed signal light ray Sb to the optical amplifier 23b. The multiplexer 21c generates the C-band wavelength-multiplexed signal light ray Sc from the main signal light rays Dc and outputs the C-band wavelength-multiplexed signal light ray Sc to the optical amplifier 23c. The multiplexers 21a to 21c are optical couplers, for example.

The optical amplifiers 23a to 23c amplify the wavelength-multiplexed signal light rays Sa to Sc and outputs the amplified light rays to the respective multiplexers 22a to 22c. The optical amplifiers 23a to 23c are erbium doped optical fiber amplifiers (EDFAs), for example.

The OSC transmission units 25a to 25c generate their respective supervisory control signal light rays (hereinafter referred to as "OSC light rays") SCa to SCc containing supervisory control information on supervisory control of the wavelength-multiplexed signal light rays Sa to Sc. The OSC light rays SCa to SCc have their respective wavelengths $\lambda a$ to $\lambda c$ in the C band. The OSC light ray SCb is an example of a first supervisory control signal light ray, and the OSC light rays SCa and SCc correspond to an example of a second supervisory control signal light ray.

The OSC transmission units 25a to 25c generate the OSC light rays SCa to SCc and output the OSC light rays SCa to SCc to the respective multiplexers 22a to 22c. The multiplexer 22a multiplexes the OSC light ray SCa to the wavelength-multiplexed signal light ray Sa. The wavelength-multiplexed signal light ray Sa and the OSC light ray SCa multiplexed are input to the wavelength conversion unit 24a. Each of the OSC transmission units 25a to 25c is a circuit including hardware such as a small form-factor pluggable (SFP), a field programmable gate array (FPGA), or an application specified integrated circuit (ASIC).

The multiplexer 22b multiplexes the OSC light ray SCb to the wavelength-multiplexed signal light ray Sb. The wavelength-multiplexed signal light ray Sb and the OSC light ray SCb multiplexed are input to the multiplexer 26.

The multiplexer 22c multiplexes the OSC light ray SCc to the wavelength-multiplexed signal light ray Sc. The wavelength-multiplexed signal light ray Sc and the OSC light ray SCc multiplexed are input to the wavelength conversion unit 24c. The multiplexers 22a to 22c are optical couplers or optical filters, for example. The multiplexers 22a and 22c correspond to an example of a first multiplexing unit, and the multiplexer 22b is an example of a second multiplexing unit.

The wavelength conversion unit 24a converts the wavelength band of the multiplexed light ray of the wavelength-multiplexed signal light ray Sa and the OSC light ray SCa from the C band to the L band, and the wavelength conversion unit 24c converts the wavelength band of the multiplexed light ray of the wavelength-multiplexed signal light ray Sc and the OSC light ray SCc from the C band to the S band. The wavelength conversion units 24a and 24c correspond to an example of a first wavelength conversion unit. The wavelength conversion unit 24a outputs the multiplexed light ray of the wavelength-multiplexed signal light ray Sa and the OSC light ray SCa to the multiplexer 26, while the wavelength conversion unit 24c outputs the multiplexed light ray of the wavelength-multiplexed signal light ray Sc and the OSC light ray SCc to the multiplexer 26.

The multiplexer 26 multiplexes each of the multiplexed light rays input from the wavelength conversion units 24a and 24c and the wavelength-multiplexed signal light ray Sb input from the multiplexer 22b, and outputs the thus obtained multiplexed light ray Smux to the transmission path 90. The multiplexer 26 is an optical coupler, for example.

In this way, the transmission unit 2a multiplexes the L-band wavelength-multiplexed signal light ray Sa, the C-band wavelength-multiplexed signal light ray Sb, and the S-band wavelength-multiplexed signal light ray Sc, which are obtained through wavelength multiplexing of the respective plurality of main signal light rays Da to Dc, and transmits the thus obtained multiplexed light ray Smux to the reception unit 3b.

The reception unit 3b includes a plurality of receivers 30a to 30c, demultiplexers 31a to 31c and 32a to 32c, optical amplifiers 33a to 33c, and an optical reception processing unit Ub. The optical reception processing unit Ub includes a demultiplexer 36 and wavelength conversion units 34a and 34c.

The multiplexed light ray Smux is input from the transmission path 90 to the demultiplexer 36. The demultiplexer 36 demultiplexes the multiplexed light ray Smux depending on the wavelength bands and outputs the light rays from different ports. The demultiplexer 36 is an optical splitter, for example.

The wavelength-multiplexed signal light ray Sa and the OSC light ray SCa in the L band are input to the wavelength conversion unit 34a. The wavelength conversion unit 34a converts the wavelength bands of the wavelength-multiplexed signal light ray Sa and the OSC light ray SCa from the L band to the C band, and outputs the wavelength-multiplexed signal light ray Sa and the OSC light ray SCa in the C band to the demultiplexer 32a.

The wavelength-multiplexed signal light ray Sc and the OSC light ray SCc in the S band are input to the wavelength conversion unit 34c. The wavelength conversion unit 34c converts the wavelength bands of the wavelength-multiplexed signal light ray Sc and the OSC light ray SCc from the S band to the C band, and outputs the wavelength-multiplexed signal light ray Sc and the OSC light ray SCc in the C band to the demultiplexer 32c. The wavelength conversion units 34a and 34c correspond to an example of a second wavelength conversion unit.

The wavelength-multiplexed signal light ray Sb and the OSC light ray SC in the C band are input from the demultiplexer 36 to the demultiplexer 32b in the subsequent stage.

The demultiplexer 32a demultiplexes the OSC light ray SCa from the wavelength-multiplexed signal light ray Sa and outputs the OSC light ray SCa to an OSC reception unit 35a. The wavelength-multiplexed signal light ray Sa is input from the demultiplexer 32a to the optical amplifier 33a. The optical amplifier 33a amplifies the wavelength-multiplexed signal light ray Sa and outputs the resultant to the demultiplexer 31a.

The demultiplexer 32b demultiplexes the OSC light ray SC from the wavelength-multiplexed signal light ray Sb and outputs the OSC light ray SCb to an OSC reception unit 35b. The wavelength-multiplexed signal light ray Sb is input from the demultiplexer 32b to the optical amplifier 33b. The optical amplifier 33b amplifies the wavelength-multiplexed signal light ray Sb and outputs the resultant to the demultiplexer 31b.

The demultiplexer 32c demultiplexes the OSC light ray SCc from the wavelength-multiplexed signal light ray Sc and outputs the OSC light ray SCc to an OSC reception unit 35c. The wavelength-multiplexed signal light ray Sc is input from the demultiplexer 32c to the optical amplifier 33c. The optical amplifier 33c amplifies the wavelength-multiplexed signal light ray Sc and outputs the resultant to the demultiplexer 31c. The demultiplexers 32a to 32c are optical splitters or optical filters, for example, and the optical amplifiers 33a to 33c are EDFAs, for example.

The OSC reception units 35a to 35c receive the respective OSC light rays SCa to SCc. The OSC reception units 35a to 35c convert the OSC light rays SCa to SCc to electrical signals and acquire the supervisory control information from the electrical signals. Each of the OSC reception units 35a to 35c is a circuit including hardware such as an SFP, an FPGA, or an ASIC.

The demultiplexer 31a demultiplexes the wavelength-multiplexed signal light ray Sa to the main signal light rays Da depending on the wavelengths and outputs each of the main signal light rays Da to the receiver 30a. The demultiplexer 31b demultiplexes the wavelength-multiplexed signal light ray Sb to the main signal light rays Db depending on the wavelengths and outputs each of the main signal light rays Db to the receiver 30b. The demultiplexer 31c demultiplexes the wavelength-multiplexed signal light ray Sc to the main signal light rays Dc depending on the wavelengths and outputs each of the main signal light rays Dc to the receiver 30c. The demultiplexers 31a to 31c are optical splitters, for example.

The receivers 30a to 30c receive the respective main signal light rays Da to Dc. The receivers 30a to 30c are coupled to, for example, a LAN on the client side, and generate client signals from the main signal light rays Da to Dc, for example, to transmit the client signals to the LAN.

In this way, the reception unit 3b receives the multiplexed light ray Smux and demultiplexes, from the multiplexed light ray Smux, the L-band wavelength-multiplexed signal light ray Sa, the C-band wavelength-multiplexed signal light ray Sb, and the S-band wavelength-multiplexed signal light ray Sc.

The control unit 1a controls the transmission unit 2a and the reception unit 3a, while the control unit 1b controls the transmission unit 2b and the reception unit 3b. The control units 1a and 1b each include circuits of a processor such as a central processing unit (CPU) and a memory, and perform various kinds of control by software functioning to drive the processor.

As an example of the control, the operation of the control units 1a and 1b in a case where the transmission path 90 is disconnected (see the cross mark) is now described. In this case, the optical amplifiers 33a to 33c of the reception unit 3b detect that the respective wavelength-multiplexed signal light rays Sa to Sc are not input, and output a signal loss alarm to the control unit 1b. The OSC reception units 35a to 35c of the reception unit 3b detect that the respective OSC light rays SCa to SCc are not received, and output a link-down alarm to the control unit 1b.

Since the conditions that the signal loss alarm and the link-down alarm are input are satisfied, the control unit 1b stops the output of the optical amplifiers 23a to 23c of the transmission unit 2b coupled to the transmission path 91 in a direction opposite to the transmission direction of the transmission path 90. The control unit 1b instructs the OSC transmission units 25a to 25c of the transmission unit 2b to transfer the link-down alarm to the reception unit 3a to which the transmission unit 2b is coupled.

With the output of the optical amplifiers 23a to 23c of the transmission unit 2b being stopped, the optical amplifiers 33a to 33c of the reception unit 3a detect that no wavelength-multiplexed signal light ray is input, and output the signal loss alarm to the control unit 1a. The OSC reception units 35a to 35c of the reception unit 3a output the link-down alarm to the control unit 1a when receiving the alarm transferred from the OSC transmission units 25a to 25c of the transmission unit 2b.

Since the conditions that the signal loss alarm and the link-down alarm are input are satisfied, the control unit 1a stops the output of the optical amplifiers 23a to 23c of the transmission unit 2a coupled to the transmission path 90. With this, the output of light to the transmission paths 90 and 91 between the transmission devices 8a and 8b is stopped, and hence the laser light hardly leaks from the transmission path 90. The safety of a worker or the like near the transmission path 90 is thus secured.

The configuration of the wavelength conversion units 24a, 24c, 34a, and 34c is next described.

Figure 2:
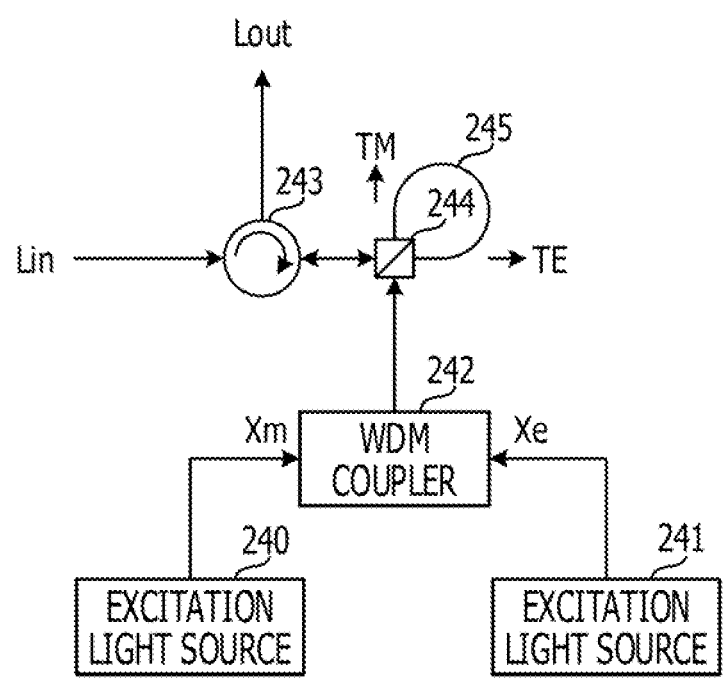
FIG. 2 is a configuration diagram illustrating an example of a wavelength conversion unit.

FIG. 2 is a configuration diagram illustrating an example of the wavelength conversion units 24a, 24c, 34a, and 34c. The wavelength conversion units 24a, 24c, 34a, and 34c each include a WDM coupler 242, excitation light sources 240 and 241, an optical circulator 243, a polarization beam splitter 244, and a highly non-linear fiber (HNLF) 245.

The multiplexed light rays of the wavelength-multiplexed signal light rays Sa and Sc and the OSC light rays SCa and SCc, which are input to the wavelength conversion units 24a, 24c, 34a, and 34c, are herein referred to as "input light Lin." The multiplexed light lays of the wavelength-multiplexed signal light rays Sa and Sc and the OSC light rays SCa and SCc, which are output from the wavelength conversion units 24a, 24c, 34a, and 34c, are herein referred to as "output light Lout."

The excitation light sources 240 and 241 output their respective excitation light rays Xm and Xe to the WDM coupler 242. The polarized waves of the excitation light rays Xm and Xe are orthogonal to each other. The WDM coupler 242 converts the two excitation light rays Xm and Xe through wavelength multiplexing and outputs the resultant to the polarization beam splitter 244. The input light Lin is input to the polarization beam splitter 244 through the optical circulator 243. The input light Lin is the multiplexed light of the wavelength-multiplexed signal light ray Sa and the OSC light ray SCa or the wavelength-multiplexed signal light ray Sc and the OSC light ray SCc.

To the polarization beam splitter 244, each end of the highly non-linear fiber 245 is coupled. The highly non-linear fiber 245 has two principal axes. An output port for TE polarized waves of the polarization beam splitter 244 is coupled to one end of the highly non-linear fiber 245 at an angle matching one of the principal axes. An output port for TM polarized waves of the polarization beam splitter 244 is coupled to the other end of the highly non-linear fiber 245 at an angle matching the same principal axis.

The excitation light rays Xm and Xe and the input light Lin are separated by the polarization beam splitter 244 to a TE polarized wave and a TM polarized wave, and the TE polarized wave and the TM polarized wave are input to the different ends of the highly non-linear fiber 245 and are then output from the other ends thereof to the polarization beam splitter 244 again.

The highly non-linear fiber 245 generates four-wave mixing (FWM) of the excitation light rays Xm and Xe and the input light Lin. Idler light generated by the four-wave mixing has a wavelength depending on a difference between the wavelengths of the excitation light rays Xm and Xe and the input light Lin. The idler light is input from the highly non-linear fiber 245 to the optical circulator 243 through the polarization beam splitter 244. The idler light is output from the optical circulator 243 as the output light Lout.

With this, the wavelength bands of the wavelength-multiplexed signal light rays Sa and Sc and the OSC light rays SCa and SCc are converted between the C band and the L band or the S band. The wavelength conversion units 24a, 24c, 34a, and 34c, which use the two excitation light rays Xm and Xe, may use a single excitation light ray.

The bandwidth of a wavelength that the wavelength conversion units 24a, 24c, 34a, and 34c may convert is determined depending on, for example, the material and structure of the highly non-linear fiber 245, and hence the wavelength conversion units 24a, 24c, 34a, and 34c is not capable of converting any C-band wavelength, for example, and have a certain limit. This means that, as the wavelength bandwidths of the OSC light rays SCa to SCc are widened, the wavelength bandwidths of the main signal light rays Da to Dc (wavelength-multiplexed signal light rays Sa to Sc) are narrowed, resulting in a reduction in amount of data that a user may transmit. In contrast to this, as the wavelength bandwidths of the main signal light rays Da to Dc are widened, the wavelength bandwidths of the OSC light rays SCa to SCc are narrowed, resulting in a reduction in amount of data of supervisory control information.

Figure 3:
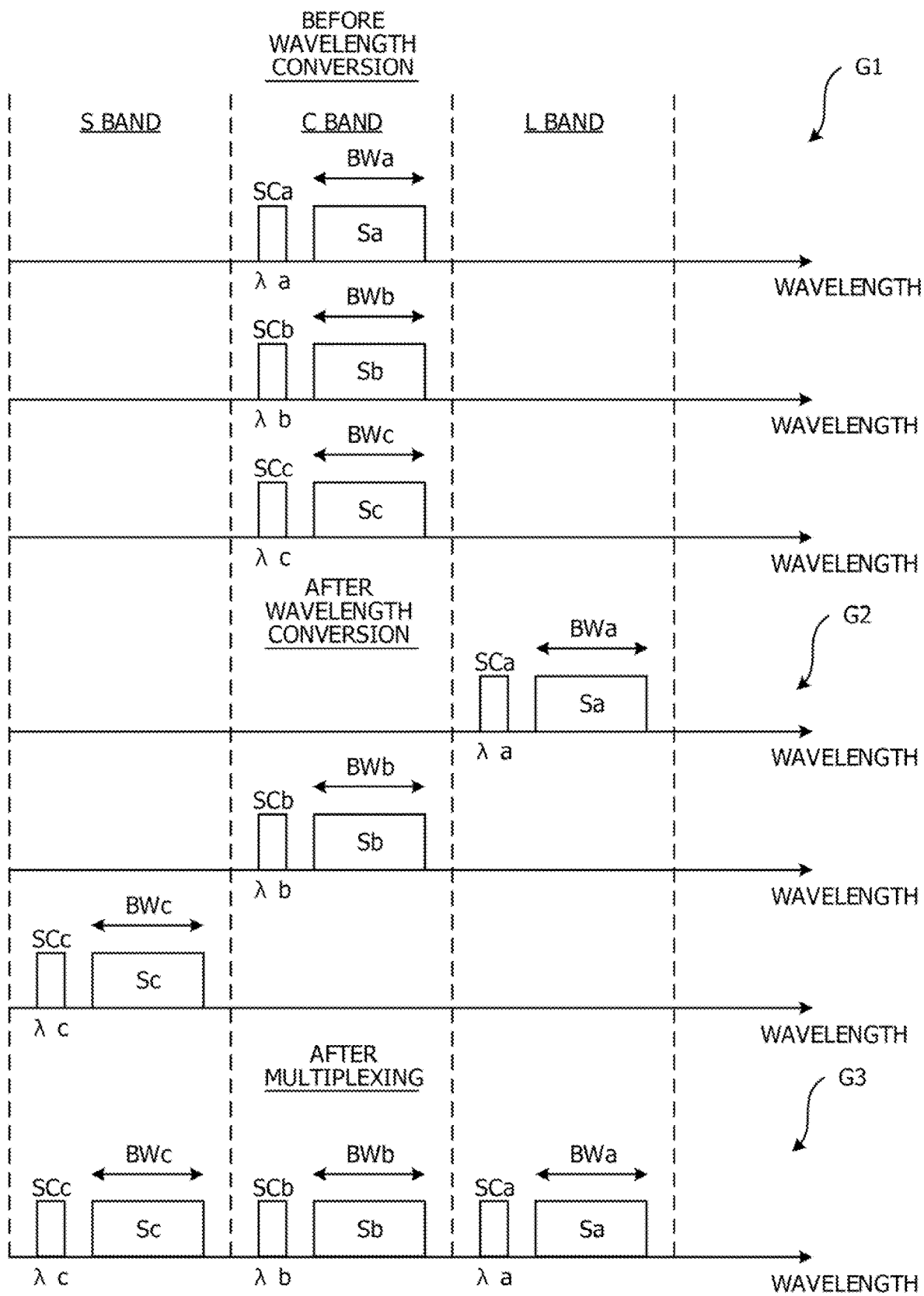
FIG. 3 is a diagram illustrating examples of wavelength bandwidths of wavelength-multiplexed signal light rays and optical supervisory channel (OSC) light rays before and after wavelength conversion and after multiplexing in a transmission unit.

FIG. 3 is a diagram illustrating examples of the wavelength bandwidths of the wavelength-multiplexed signal light rays Sa to Sc and the OSC light rays SCa to SCc before and after wavelength conversion and after multiplexing in the transmission unit 2a. The reference symbols λa to λc indicate the center wavelengths of the respective OSC light rays SCa to SCc (hereinafter simply referred to as "wavelengths λa to λc"), and the reference symbols BWa to BWc indicate the bandwidths of the respective wavelength-multiplexed signal light rays Sa to Sc.

The symbol G1 indicates the wavelength bandwidths before wavelength conversion. The wavelength-multiplexed signal light rays Sa to Sc and the OSC light rays SCa to SCc before wavelength conversion are set in the C band.

The symbol G2 indicates the wavelength bandwidths after wavelength conversion. The wavelength-multiplexed signal light ray Sa and the OSC light ray SCa after wavelength conversion are set in the L band, while the wavelength-multiplexed signal light ray Sc and the OSC light ray SCc after wavelength conversion are set in the S band. The wavelength-multiplexed signal light ray Sb and the OSC light ray SCb are not subjected to wavelength conversion, and remain in the C band.

The symbol G3 indicates the wavelength bandwidths after multiplexing. The wavelength-multiplexed signal light rays Sa to Sc and the OSC light rays SCa to SCc are set so that the wavelength bandwidths do not overlap each other after wavelength conversion.

In this way, the wavelength-multiplexed signal light ray Sa and the OSC light ray SCa are set in the common wavelength band, the wavelength-multiplexed signal light ray Sb and the OSC light ray SCb are set in the common wavelength band, and the wavelength-multiplexed signal light ray Sc and the OSC light ray SCc are set in the common wavelength band.

Thus, considering the bandwidth of a wavelength that the wavelength conversion units 24a, 24c, 34a, and 34c may convert, the bandwidths BWa to BWc of the wavelength-multiplexed signal light rays Sa to Sc are narrowed depending on the bandwidths of the OSC light rays SCa to SCc.

This means that the number of the main signal light rays Da to Dc that are converted to the wavelength-multiplexed signal light rays Sa to Sc through wavelength multiplexing, for example, the number of channels of client signals is reduced.

When the bandwidths of the OSC light rays SCa to SCc are reduced, on the other hand, the number of the main signal light rays Da to Dc that are converted to the wavelength-multiplexed signal light rays Sa to Sc through wavelength multiplexing may be increased, but the amount of data of supervisory Information that the OSC light rays SCa to SCc may contain is reduced.

First Embodiment

In view of the above, in the transmission devices 8a and 8b of a first embodiment, the transmission processing is performed with the OSC light rays SCa to SCc having the wavelengths λa to λc set outside the wavelength bands of the wavelength-multiplexed signal light rays Sa to Sc (C band, L band, and S band) so that the wavelengths of the OSC light rays SCa to SCc are not converted. The transmission device 8a is an example of a first transmission device, and the transmission device 8b is an example of a second transmission device.

Figure 4:
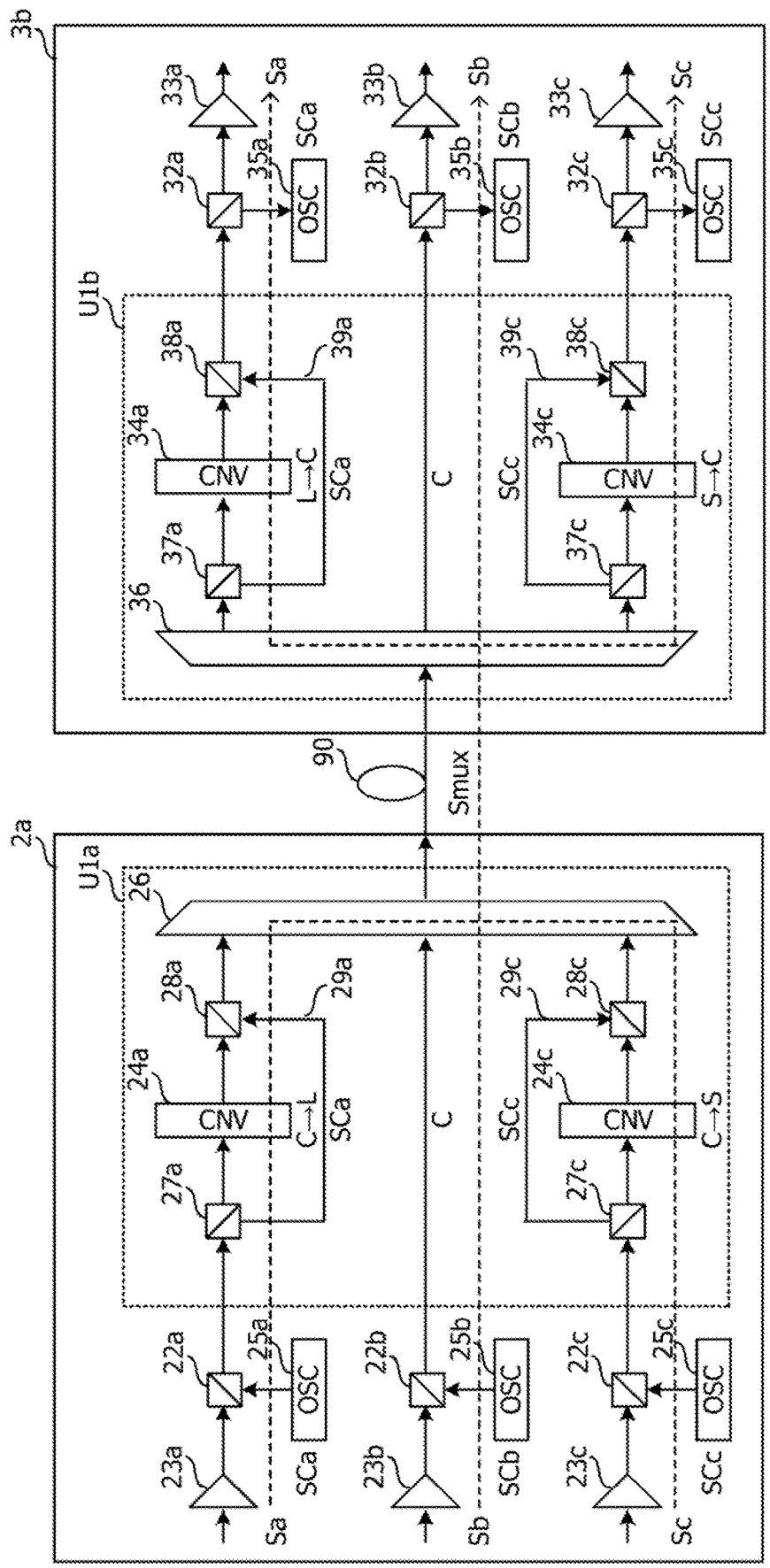
FIG. 4 is a configuration diagram illustrating a transmission unit and a reception unit of a first embodiment.

FIG. 4 is a configuration diagram illustrating a transmission unit and a reception unit of the first embodiment. In FIG. 4, configurations common to those in FIG. 1 are indicated by the same symbols, and description thereof is omitted.

The illustrations of the transmitters 20a to 20c, the multiplexers 21a to 21c, the demultiplexers 31a to 31c, the receivers 30a to 30c, the control units 1a and 1b, the transmission unit 2b, and the reception unit 3a in FIG. 1 are omitted. The transmission unit 2b has the same configuration as the transmission unit 2a has, and the reception unit 3a has the same configuration as the reception unit 3b has.

The transmission unit 2a includes an optical transmission processing unit U1a instead of the optical transmission processing unit Ua of the comparative example. The optical transmission processing unit U1a includes demultiplexers 27a and 27c, the wavelength conversion units 24a and 24c, and multiplexers 28a, 28c, and 26. The demultiplexers 27a and 27c are WDM filters, for example, and the multiplexers 28a and 28c are WDM filters, for example.

The demultiplexer 27a is coupled between the multiplexer 22a and the wavelength conversion unit 24a, and the demultiplexer 27c is coupled between the multiplexer 22c and the wavelength conversion unit 24c. The multiplexer 28a is coupled between the wavelength conversion unit 24a and the multiplexer 26, and the multiplexer 28c is coupled between the wavelength conversion unit 24c and the multiplexer 26. For example, the demultiplexers 27a and 27c are provided in the preceding stage of the wavelength conversion units 24a and 24c, and the multiplexers 28a and 28c are provided in the subsequent stage of the wavelength conversion units 24a and 24c.

The demultiplexer 27a and the multiplexer 28a are coupled to each other by a detour path 29a detouring around the wavelength conversion unit 24a. The demultiplexer 27c and the multiplexer 28c are coupled to each other by a detour path 29c detouring around the wavelength conversion unit 24c. The detour paths 29a and 29c are optical fibers, for example.

The demultiplexer 27a demultiplexes the OSC light ray SCa from the wavelength-multiplexed signal light ray Sa. The wavelength-multiplexed signal light ray Sa is input from the demultiplexer 27a to the wavelength conversion unit 24a. The OSC light ray SCa is input from the demultiplexer 27a to the multiplexer 28a through the detour path 29a. The multiplexer 28a multiplexes the OSC light ray SCa to the wavelength-multiplexed signal light ray Sa after wavelength conversion.

With this, the OSC light ray SCa may detour around the wavelength conversion unit 24a and is thus not subjected to wavelength conversion. Since the wavelength λa of the OSC light ray SCa is set outside the C band, the L band, and the S band, the bandwidth BWa of the wavelength-multiplexed signal light ray Sa may be the maximum bandwidth that the wavelength conversion unit 24a may convert. A reduction in number of channels of the main signal light rays Da that are converted to the wavelength-multiplexed signal light ray Sa through wavelength multiplexing is therefore decreased. The demultiplexer 27a, the multiplexer 28a, and the detour path 29a correspond to an example of a first multiplexing/demultiplexing unit.

The demultiplexer 27c demultiplexes the OSC light ray SCc from the wavelength-multiplexed signal light ray Sc. The wavelength-multiplexed signal light ray Sc is input from the demultiplexer 27c to the wavelength conversion unit 24c. The OSC light ray SCc Is Input from the demultiplexer 27c to the multiplexer 28c through the detour path 29c. The multiplexer 28c multiplexes the OSC light ray SCc to the wavelength-multiplexed signal light ray Sc after wavelength conversion.

With this, the OSC light ray SCc may detour around the wavelength conversion unit 24c and is thus not subjected to wavelength conversion. Since the wavelength λc of the OSC light ray SCc is set outside the C band, the L band, and the S band, the bandwidth BWc of the wavelength-multiplexed signal light ray Sc may be the maximum bandwidth that the wavelength conversion unit 24c may convert. The demultiplexer 27c, the multiplexer 28c, and the detour path 29c correspond to an example of the first multiplexing/demultiplexing unit.

Meanwhile, the reception unit 3b includes an optical reception processing unit U1b instead of the optical reception processing unit Ub of the comparative example. The optical reception processing unit U1b includes demultiplexers 36, 37a, and 37c, the wavelength conversion units 34a and 34c, and multiplexers 38a and 38c. The demultiplexers 37a and 37c are WDM filters, for example, and the multiplexers 38a and 38c are WDM filters, for example.

The demultiplexer 37a is coupled between the demultiplexer 36 and the wavelength conversion unit 34a, and the demultiplexer 37c is coupled between the demultiplexer 36 and the wavelength conversion unit 34c. The multiplexer 38a is coupled between the wavelength conversion unit 34a and the demultiplexer 32a, and the multiplexer 38c is coupled between the wavelength conversion unit 34c and the demultiplexer 32c. For example, the demultiplexers 37a and 37c are provided in the preceding stage of the wavelength conversion units 34a and 34c, and the multiplexers 38a and 38c are provided in the subsequent stage of the wavelength conversion units 34a and 34c.

The demultiplexer 37a and the multiplexer 38a are coupled to each other by a detour path 39a detouring around the wavelength conversion unit 34a. The demultiplexer 37c and the multiplexer 38c are coupled to each other by a detour path 39c detouring around the wavelength conversion unit 34c. The detour paths 39a and 39c are optical fibers, for example.

The demultiplexer 37a demultiplexes the OSC light ray SCa from the wavelength-multiplexed signal light ray Sa. The wavelength-multiplexed signal light ray Sa is input from the demultiplexer 37a to the wavelength conversion unit 34a. The OSC light ray SCa is input from the demultiplexer 37a to the multiplexer 38a through the detour path 39a. The multiplexer 38a multiplexes the OSC light ray SCa to the wavelength-multiplexed signal light ray Sa after wavelength conversion.

With this, the OSC light ray SCa may detour around the wavelength conversion unit 34a and is thus not subjected to wavelength conversion. Since the wavelength λa of the OSC light ray SCa is set outside the C band, the L band, and the S band, the bandwidth BWa of the wavelength-multiplexed signal light ray Sa may be the maximum bandwidth that the wavelength conversion unit 34a may convert. The demultiplexer 37a, the multiplexer 38a, and the detour path 39a correspond to an example of a second multiplexing/demultiplexing unit.

The demultiplexer 37c demultiplexes the OSC light ray SCc from the wavelength-multiplexed signal light ray Sc. The wavelength-multiplexed signal light ray Sc is input from the demultiplexer 37c to the wavelength conversion unit 34c. The OSC light ray SCc is input from the demultiplexer 37c to the multiplexer 38c through the detour path 39c. The multiplexer 38c multiplexes the OSC light ray SCc to the wavelength-multiplexed signal light ray Sc after wavelength conversion.

With this, the OSC light ray SCc may detour around the wavelength conversion unit 34c and is thus not subjected to wavelength conversion. Since the wavelength λc of the OSC light ray SCc is set outside the C band, the L band, and the S band, the bandwidth BWc of the wavelength-multiplexed signal light ray Sc may be the maximum bandwidth that the wavelength conversion unit 34c may convert. The demultiplexer 37c, the multiplexer 38c, and the detour path 39c correspond to an example of the second multiplexing/demultiplexing unit.

In this way, the transmission unit 2a and the reception unit 3b only convert, by the wavelength conversion units 24a, 24c, 34a, and 34c, the wavelength bands of the wavelength-multiplexed signal light rays Sa and Sc without converting the wavelength bands of the OSC light rays SCa and SCc.

Figure 5:
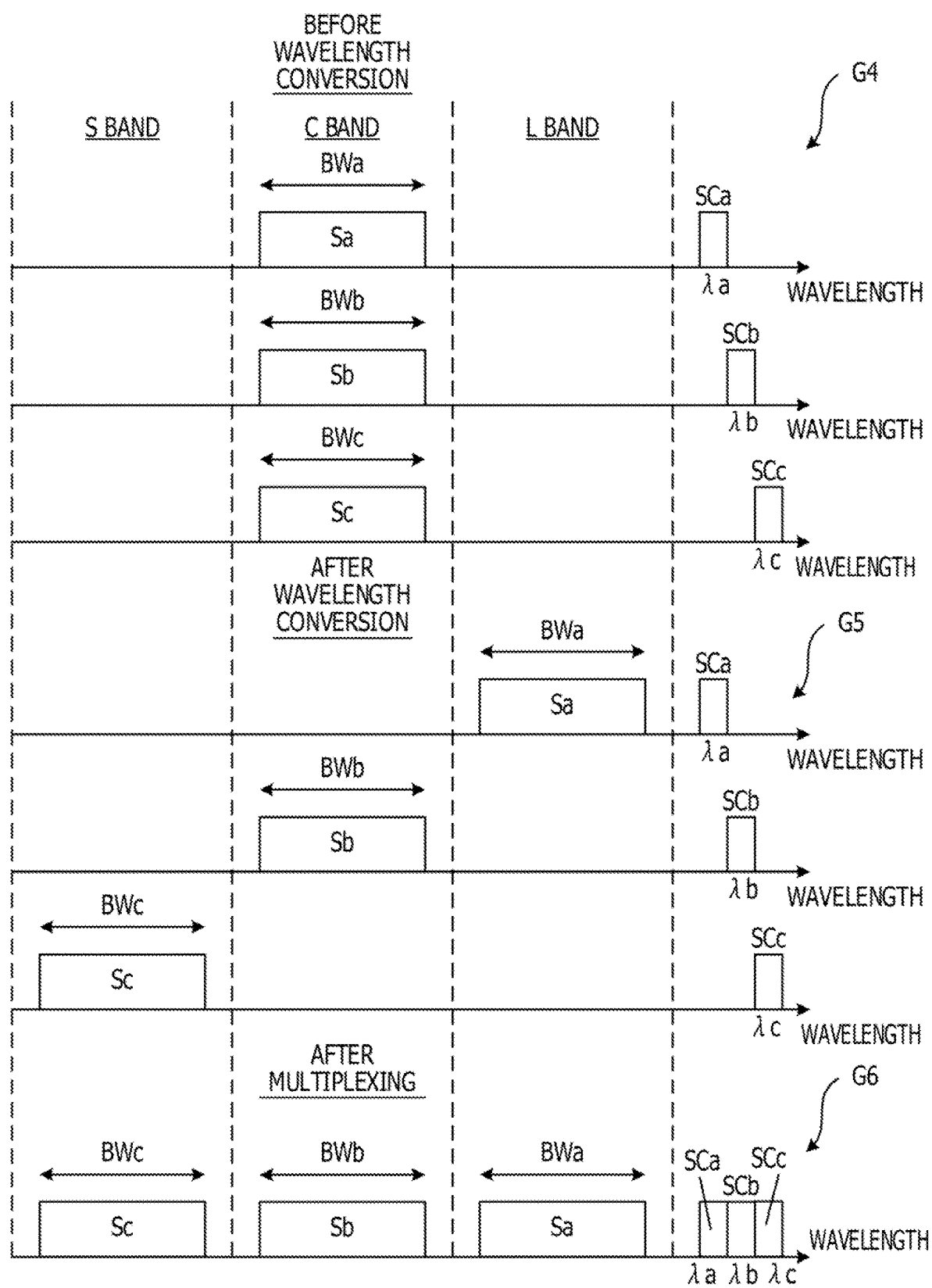
FIG. 5 is a diagram illustrating examples of wavelength bandwidths of wavelength-multiplexed signal light rays and OSC light rays before and after wavelength conversion and after multiplexing in a transmission unit.

FIG. 5 is a diagram illustrating examples of the wavelength bandwidths of the wavelength-multiplexed signal light rays Sa to Sc and the OSC light rays SCa to SCc before and after wavelength conversion and after multiplexing in the transmission unit 2a.

The symbol G4 indicates the wavelength bandwidths before wavelength conversion. The wavelengths λa to λc of the respective OSC light rays SCa to SCc are set outside the S band, the C band, and the L band. For example, the wavelengths λa to λc are set on the long wavelength side of the L band in order to avoid absorption of an excitation wavelength and an OH group due to distributed raman amplification (DRA). The wavelengths λa, λb, and λc may be different from each other, and may be 1,630 (nm), 1,640 (nm), and 1,650 (nm), respectively, for example.

Since the wavelengths λa to λc are set outside the S band, the C band, and the L band, the bandwidths BWa to BWc of the wavelength-multiplexed signal light rays Sa to Sc are wider than the bandwidths BWa to BWc of the comparative example in FIG. 3. Thus, to the wavelength-multiplexed signal light rays Sa to Sc, the greater number of the main signal light rays Da to Dc than that of the comparative example may be converted through wavelength multiplexing.

The symbol G5 indicates the wavelength bandwidths after wavelength conversion. The wavelength bands of the wavelength-multiplexed signal light rays Sa and Sc are converted from the C band to the L band or the S band, but the wavelength bands of the OSC light rays SCa and SCc are not converted.

The symbol G6 Indicates the wavelength bandwidths after multiplexing. Since the wavelengths λa to λc are different from each other, the OSC light rays SCa to SCc are multiplexed without overlapping each other in spectrum.

In this way, the transmission unit 2a demultiplexes the OSC light ray SCa from the C-band wavelength-multiplexed signal light ray Sa and multiplexes the OSC light ray SCa to the L-band wavelength-multiplexed signal light ray Sa to make the OSC light ray SCa detour around the wavelength conversion unit 24a so that the transmission unit 2a does not convert the wavelength band of the OSC light ray SCa. Similar to the OSC light ray SCa, the OSC light ray SCc also detours around the wavelength conversion unit 24c and the wavelength band thereof is thus not converted.

The OSC light rays SCa to SCc have the respective wavelengths λa to λc outside the S band, the C band, and the L band. This means that the bandwidths BWa to BWc of the wavelength-multiplexed signal light rays Sa to Sc may be widened by amounts corresponding to the bandwidths of the OSC light rays SCa to SCc. Thus, to the wavelength-multiplexed signal light rays Sa to Sc, the greater number of the main signal light rays Da to Dc than that of the comparative example may be converted through multiplexing.

Meanwhile, the reception unit 3b demultiplexes the OSC light ray SCa from the L-band wavelength-multiplexed signal light ray Sa and multiplexes the OSC light ray SCa to the C-band wavelength-multiplexed signal light ray Sa to make the OSC light ray SCa detour around the wavelength conversion unit 34a so that the reception unit 3b does not convert the wavelength band of the OSC light ray SCa. Similar to the OSC light ray SCa, the OSC light ray SCc also detours around the wavelength conversion unit 34c and the wavelength band thereof is thus not converted.

The reception unit 3b may therefore normally receive the wavelength-multiplexed signal light rays Sa to Sc and the OSC light rays SCa to SCc.

In conclusion, according to the transmission system of this example, a reduction in wavelength bandwidth of the main signal light rays Da to Dc and the OSC light rays SCa to SCc may be decreased. The transmission processing of the wavelength-multiplexed signal light rays Sa to Sc and the OSC light rays SCa to SCc by the transmission system of this example Is one of transmission methods according to the embodiments.

According to this example, the OSC light rays SCa and SCc are not input to the wavelength conversion units 24a, 24c, 34a, and 34c, and hence cross phase modulation (XPM) between the wavelength-multiplexed signal light rays Sa and Sc and the OSC light rays SCa and SCc in the highly non-linear fiber 245 is reduced. With this, a deterioration in transmission quality of the wavelength-multiplexed signal light rays Sa and Sc is reduced.

Even in a case where the OSC light rays SCa and SCc are input to the wavelength conversion units 24a, 24c, 34a, and 34c, the cross-phase modulation may hardly occur when the power of the OSC light rays SCa and SCc is lowered. When the power of the OSC light rays SCa and SCc is lowered to a level at which four-wave mixing does not occur, the wavelength bands of the OSC light rays SCa and SCc are not converted as in this example. When the power is lowered, however, due to a loss on the transmission path 90, the transmission distances of the OSC light rays SCa and SCc are shorter than those of the comparative example.

In contrast to this, in this example, the wavelength bandwidths of the wavelength-multiplexed signal light rays Sa to Sc are widened without reducing the power of the OSC light rays SCa and SCc, and hence the transmission distances do not fall below those of the comparative example.

Second Embodiment

In the first embodiment, the wavelengths $\lambda a$ to $\lambda c$ of the OSC light rays SCa to SCc are different from each other, and hence the OSC transmission units 25a to 25c and the OSC reception units 35a to 35c transmit and receive the OSC light rays SCa to SCc having the wavelengths $\lambda a$ to $\lambda c$ different from each other. This means that, for example, the control units 1a and 1b individually make the wavelength settings of the OSC transmission units 25a to 25c and the OSC reception units 35a to 35c, which Is troublesome.

In view of this, as in this example, in order to allow the OSC transmission units 25a to 25c and the OSC reception units 35a to 35c to transmit and receive the OSC light rays SCa to SCc having a common wavelength $\lambda o$, the wavelength $\lambda o$ may be converted to the Individual wavelengths $\lambda a$ to $\lambda c$ between the OSC transmission units 25a to 25c and the OSC reception units 35a to 35c.

Figure 6:
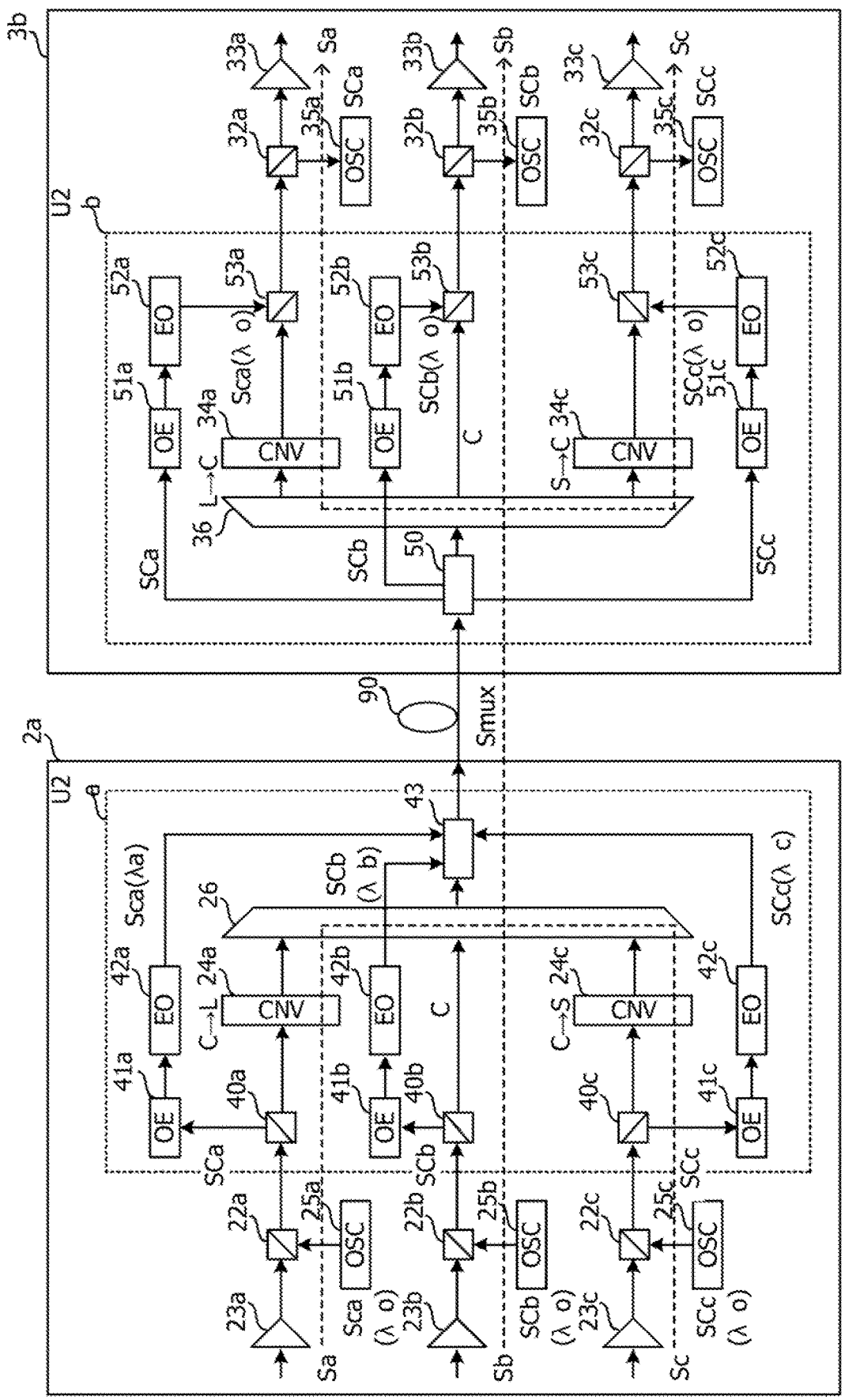
FIG. 6 is a configuration diagram illustrating a transmission unit and a reception unit of a second embodiment.

FIG. 6 is a configuration diagram illustrating a transmission unit and a reception unit of a second embodiment. In FIG. 6, configurations common to those in FIG. 1 are indicated by the same symbols, and description thereof is omitted.

In FIG. 6, the Illustrations of the transmitters 20a to 20c, the multiplexers 21a to 21c, the demultiplexers 31a to 31c, the receivers 30a to 30c, the control units 1a and 1b, the transmission unit 2b, and the reception unit 3a in FIG. 1 are omitted. The transmission unit 2b has the same configuration as the transmission unit 2a has, and the reception unit 3a has the same configuration as the reception unit 3b has.

The transmission unit 2a Includes an optical transmission processing unit U2a instead of the optical transmission processing unit Ua of the comparative example. The optical transmission processing unit U2a includes demultiplexers 40a to 40c, optical-electrical conversion (OE) units 41a to 41c, electrical-optical conversion (EO) units 42a to 42c, the wavelength conversion units 24a and 24c, and a multiplexer 43. The demultiplexers 40a to 40c are WDM filters, for example, and the multiplexer 43 is a WDM filter, for example.

The demultiplexer 40a is coupled between the multiplexer 22a and the wavelength conversion unit 24a, and the demultiplexer 40c is coupled between the multiplexer 22c and the wavelength conversion unit 24c. The demultiplexer 40b is coupled between the multiplexer 22b and the multiplexer 26. The OE units 41a to 41c are coupled to the respective demultiplexers 40a to 40c and the respective EO units 42a to 42c. The EO units 42a to 42c are coupled to the respective OE units 41a to 41c. The multiplexer 43 is coupled to the EO units 42a to 42c, the multiplexer 26, and the transmission path 90.

The OSC transmission units 25a to 25c output the OSC light rays SCa to SCc having the common wavelength $\lambda o$ to the respective multiplexers 22a to 22c. To the demultiplexers 40a to 40c, the respective multiplexed light rays of the OSC light rays SCa to SCc having the wavelength $\lambda o$ and the wavelength-multiplexed signal light rays Sa to Sc are input.

The demultiplexers 40a to 40c demultiplex the OSC light rays SCa to SCc from the respective wavelength-multiplexed signal light rays Sa to Sc. The wavelength-multiplexed signal light rays Sa and Sc are input from the demultiplexers 40a and 40c to the respective wavelength conversion units 24a and 24c. The wavelength-multiplexed signal light ray Sb is input from the demultiplexer 40b to the multiplexer 26. The multiplexer 26 multiplexes the multiplexed light rays input from each of the wavelength conversion units 24a and 24c and the wavelength-multiplexed signal light ray Sb input from the multiplexer 22b, and outputs the resultant to the multiplexer 43.

The OSC light rays SCa to SCc are input from the demultiplexers 40a to 40c to the respective OE units 41a to 41c. The OE units 41a to 41c convert the OSC light rays SCa to SCc from optical signals to electrical signals and output the electrical signals to the respective EO units 42a to 42c. The OE units 41a to 41c are photodiodes, for example.

The EO units 42a to 42c convert the electrical signals input from the respective OE units 41a to 41c to optical signals. The EO units 42a to 42c output, as the optical signals, the respective OSC light rays SCa to SCc having the wavelengths $\lambda a$ to $\lambda c$ to the multiplexer 43.

The multiplexer 43 multiplexes the OSC light rays SCa to SCc input from the respective EO units 42a to 42c to the multiplexed light rays of the wavelength-multiplexed signal light rays Sa to Sc input from the multiplexer 26 in the preceding stage. With this, the multiplexer 43 generates the multiplexed light ray Smux and outputs the multiplexed light ray Smux to the transmission path 90.

With the configuration described above, the OSC light rays SCa and SCc are respectively demultiplexed from the wavelength-multiplexed signal light rays Sa and Sc by the demultiplexers 40a and 40c, to thereby be input to the multiplexer 43 through the OE units 41a and 41c and the EO units 42a and 42c. The OSC light rays SCa and SCc thus detour around the wavelength conversion units 24a and 24c, and the wavelength bands thereof are not converted.

Also in this example, an effect similar to that of the first embodiment is therefore obtained. The demultiplexers 40a and 40c, the OE units 41a and 41c, the EO units 42a and 42c, and the multiplexer 43 correspond to an example of the first multiplexing/demultiplexing unit.

The EO units 42a and 42c convert the wavelength $\lambda o$ of the OSC light rays SCa and SCc to the wavelengths $\lambda a$ and $\lambda c$, which are different from the wavelength $\lambda b$ of the OSC light ray SCb. Thus, even when the OSC light rays SCa to SCc that the respective OSC transmission units 25a to 25c generate have the same wavelength $\lambda o$, the OSC light rays SCa to SCc having the individual wavelengths $\lambda a$ to $\lambda c$ are converted to the wavelength-multiplexed signal light rays Sa to Sc through wavelength multiplexing in the multiplexer 43 without overlapping each other in wavelength band. The EO units 42a and 42c correspond to an example of a third wavelength conversion unit.

In this example, the OSC light ray SCc is converted from the wavelength $\lambda o$ to the wavelength $\lambda c$ by the EO unit 42c, but in a case where the OSC transmission unit 25b generates the OSC light ray SCb having the wavelength $\lambda b$, the EO unit 42c does not necessarily perform wavelength conversion. In this case, when the OSC transmission units 25a and 25c, which are other OSC transmission units, generate the respective OSC light rays SCa and SCc having the wavelength λb, the OSC light rays SCa to SCc may have the common wavelength λb in transmission.

Meanwhile, the reception unit 3*b* includes an optical reception processing unit U2*b* instead of the optical reception processing unit U*b* of the comparative example. The optical reception processing unit U2*b* includes demultiplexers 36 and 50, OE units 51*a* to 51*c*, EO units 52*a* to 52*c*, the wavelength conversion units 34*a* and 34*c*, and multiplexers 53*a* to 53*c*. The demultiplexer 50 is a WDM filter, for example, and the multiplexers 53*a* to 53*c* are WDM filters, for example.

The demultiplexer 50 is coupled between the transmission path 90 and the demultiplexer 36. The demultiplexer 50 demultiplexes the OSC light rays SCa to SCc from the multiplexed light ray Smux and outputs the OSC light rays SCa to SCc to the respective OE units 51*a* to 51*c*. The OE units 51*a* to 51*c* are coupled to the respective EO units 52*a* to 52*c*. The EO units 52*a* to 52*c* are coupled to the respective multiplexers 53*a* to 53*c*.

The OSC light rays SCa to SCc are input from the demultiplexer 50 to the respective OE units 51*a* to 51*c*. The OE units 51*a* to 51*c* convert the OSC light rays SCa to SCc from optical signals to electrical signals and output the electrical signals to the respective EO units 52*a* to 52*c*. The OE units S1a to Sic are photodiodes, for example.

The EO units 52*a* to 52*c* convert the electrical signals input from the respective OE units S1a to 51*c* to optical signals. The EO units 52*a* to 52*c* output, as the optical signals, the OSC light rays SCa to SCc having the common wavelength λo to the respective multiplexers 53*a* to 53*c*.

The multiplexers 53*a* to 53*c* multiplex the OSC light rays SCa to SCc to the respective wavelength-multiplexed signal light rays Sa to Sc. The multiplexed light rays of the wavelength-multiplexed signal light rays Sa to Sc and the OSC light rays SCa to SCc are input to the respective demultiplexers 32*a* to 32*c*.

With the configuration described above, the OSC light rays SCa and SCc are demultiplexed from the wavelength-multiplexed signal light rays Sa and Sc by the demultiplexer 50, to thereby be input to the multiplexers 53*a* and 53*c* through the OE units 51*a* and 51*c* and the EO units 52*a* and 52*c*. The OSC light rays SCa and SCc thus detour around the wavelength conversion units 34*a* and 34*c*, and the wavelength bands thereof are not converted.

With this, the OSC reception units 35*a* to 35*c* may receive the respective OSC light rays SCa to SCc having the common wavelength λo. The demultiplexer 50, the OE units 51*a* and 51*c*, the EO units 52*a* and 52*c*, and the multiplexers 53*a* and 53*c* correspond to an example of the second multiplexing/demultiplexing unit. The transmission processing of the wavelength-multiplexed signal light rays Sa to Sc and the OSC light rays SCa to SCc by the transmission system of this example is one of the transmission methods according to the embodiments.

Third Embodiment

In the first and second embodiments, the transmission unit 2*a* multiplexes the OSC light rays SCa to SCc having the individual wavelengths λa to λc to the wavelength-multiplexed signal light rays Sa to Sc, to thereby generate the multiplexed light ray Smux, and outputs the multiplexed light ray Smux to the transmission path 90. The transmission unit 2*a* is, however, not limited to this configuration. The transmission unit 2*a* may multiplex OSC light rays SCo (SCa to SCc) having a common wavelength λm to the wavelength-multiplexed signal light rays Sa to Sc, to thereby generate the multiplexed light ray Smux, and output the multiplexed light ray Smux to the transmission path 90.

Figure 7:
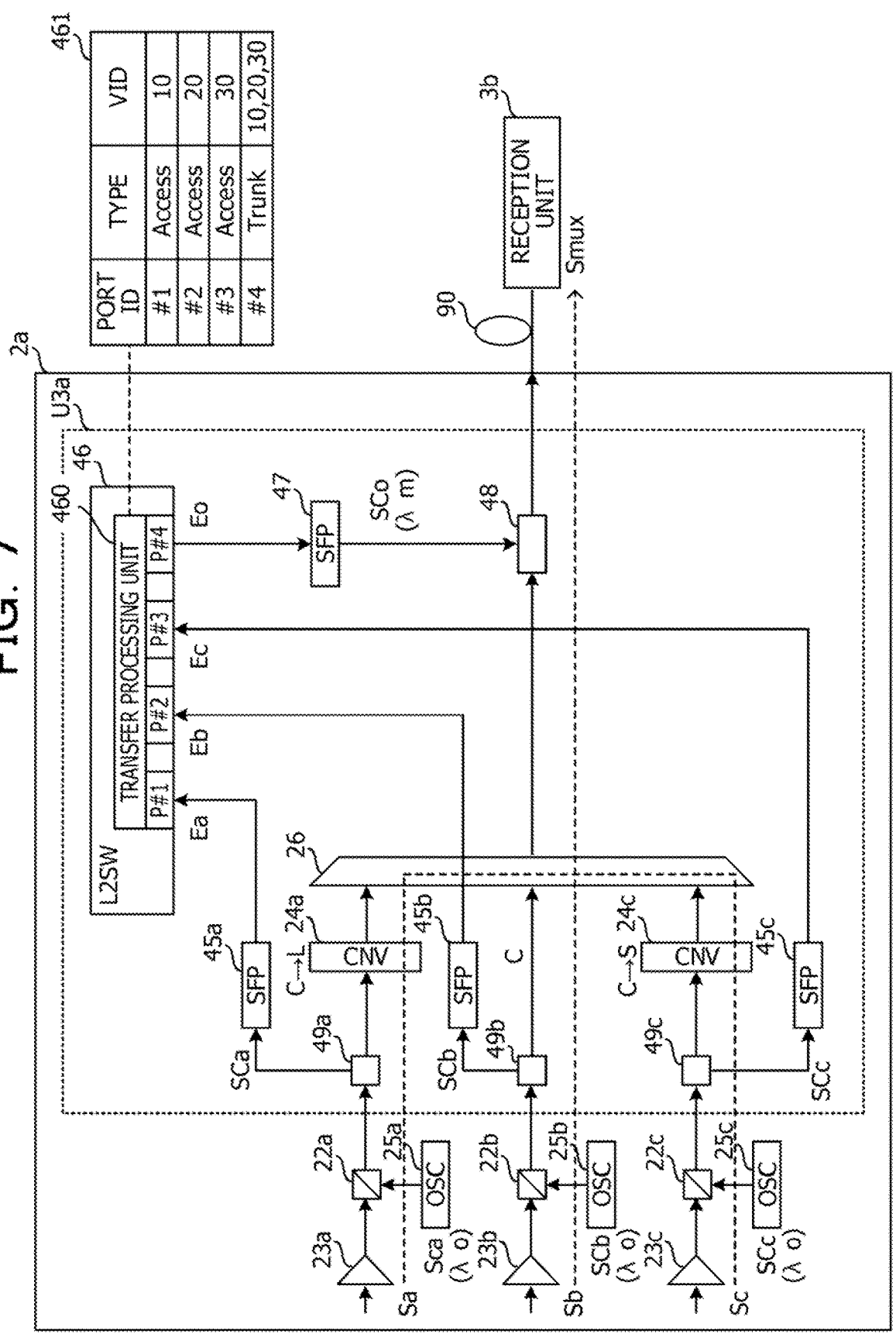
FIG. 7 is a configuration diagram illustrating a transmission unit of a third embodiment.

FIG. 7 is a configuration diagram illustrating a transmission unit of a third embodiment. In FIG. 7, configurations common to those in FIG. 1 are indicated by the same symbols, and description thereof is omitted.

In FIG. 7, the illustrations of the transmitters 20*a* to 20*c*, the multiplexers 21*a* to 21*c*, the control units 1*a* and 1*b*, the transmission unit 2*b*, and the reception unit 3*a* in FIG. 1 are omitted. The transmission unit 2*b* has the same configuration as the transmission unit 2*a* has.

The transmission unit 2*a* includes an optical transmission processing unit U3*a* instead of the optical transmission processing unit U*a* of the comparative example. The optical transmission processing unit U3*a* includes the wavelength conversion units 24*a* and 24*c*, demultiplexers 49*a* to 49*c*, SFPs 45*a* to 45*c* and 47, a layer 2 switch (L2SW) unit 46, and multiplexers 26 and 48. The demultiplexers 49*a* to 49*c* are WDM filters, for example, and the multiplexer 48 is an optical coupler or an optical filter, for example. The L2SW unit 46 is a circuit Including hardware such as an FPGA or an ASIC.

The demultiplexer 49*a* is coupled between the multiplexer 22*a* and the wavelength conversion unit 24*a*, and the demultiplexer 49*c* is coupled between the multiplexer 22*c* and the wavelength conversion unit 24*c*. The demultiplexer 49*b* is coupled between the multiplexer 22*b* and the multiplexer 26. The SFP 45*a* is coupled between the L2SW unit 46 and the demultiplexer 49*a*, the SFP 45*b* is coupled between the L2SW unit 46 and the demultiplexer 49*b*, and the SFP 45*c* is coupled between the L2SW unit 46 and the demultiplexer 49*c*. The L2SW unit 46 is coupled between the SFPs 45*a* to 45*c* and the SFP 47. The multiplexer 48 is coupled between the multiplexer 26 and the transmission path 90.

The OSC transmission units 25*a* to 25*c* output the OSC light rays SCa to SCc having the common wavelength λo to the respective multiplexers 22*a* to 22*c*. To the demultiplexers 49*a* to 49*c*, the respective multiplexed light rays of the OSC light rays SCa to SCc having the wavelength λo and the wavelength-multiplexed signal light rays Sa to Sc are input.

The demultiplexers 49*a* to 49*c* demultiplex the OSC light rays SCa to SCc from the respective wavelength-multiplexed signal light rays Sa to Sc. The wavelength-multiplexed signal light rays Sa and Sc are input from the demultiplexers 49*a* and 49*c* to the respective wavelength conversion units 24*a* and 24*c*. The wavelength-multiplexed signal light ray Sb is input from the demultiplexer 49*b* to the multiplexer 26. The demultiplexers 49*a* and 49*c* correspond to an example of a first demultiplexing unit.

The OSC light rays SCa to SCc are input from the demultiplexers 49*a* to 49*c* to the respective SFPs 45*a* to 45*c*. The SFPs 45*a* to 45*c* convert the OSC light rays SCa to SCc input from the respective demultiplexers 49*a* to 49*c* to their respective electrical data signals Ea to Ec. The SFPs 45*a* to 45*c* output the respective data signals Ea to Ec to the L2SW unit 46. The SFP 45*b* is an example of a first optical-electrical conversion unit, and the data signal Eb is an example of a first data signal. The SFPs 45*a* and 45*c* correspond to an example of a second optical-electrical conversion unit, and the data signals Ea and Ec correspond to an example of a second data signal.

The L2SW unit 46 converts, through time-division multiplexing, the data signals Ea to Ec input from the SFPs 45*a* to 45*c*. The L2SW unit 46 includes ports P #1 to P #4 and a transfer processing unit 460. The ports P #1 to P #4 are used for transmission/reception of data signals, for example, Ethernet signals. The transfer processing unit 460 exchanges data signals between the ports P #1 to P #4 based on a transfer table 461 in a memory, for example. The transfer table 461 is set from the control units 1a and 1b to the L2SW unit 46, for example.

In the transfer table 461, port identifiers (IDs), types, and virtual LAN identifiers (VIDs) are registered, for example. The port IDs are the identifiers of the ports P #1 to P #4 (#1 to #4). As the types, "Access" is set for the ports P #1 to P #3 through which data signals in a single VLAN are input and output, and "Trunk" is set for the port P #4 through which data signals in a plurality of VLANs are input and output. The VIDs are the identifiers of data signal lines corresponding to the ports P #1 to P #4.

In this example, the data signals Ea to Ec are input to the respective ports P #1 to P #3. To the VIDs of the ports P #1, P #2, and P #3, "10," "20," and "30" are set, respectively. With this, the transfer processing unit 460 gives the VIDs of "10," "20," and "30" to the data signals Ea, Eb, and Ec, respectively.

The type of the port P #4 is set to "Trunk," and the VID of the port P #4 is set to "10," "20," and "30." The transfer processing unit 460 thus converts the data signals Ea to Ec with the VIDs through time-division multiplexing and outputs the resultant from the port P #4. A time-division multiplexed signal Eo obtained through time-division multiplexing of the data signals Ea to Ec is input to the SFP 47. The L2SW unit 46 is an example of a multiplexing unit.

Figure 8:
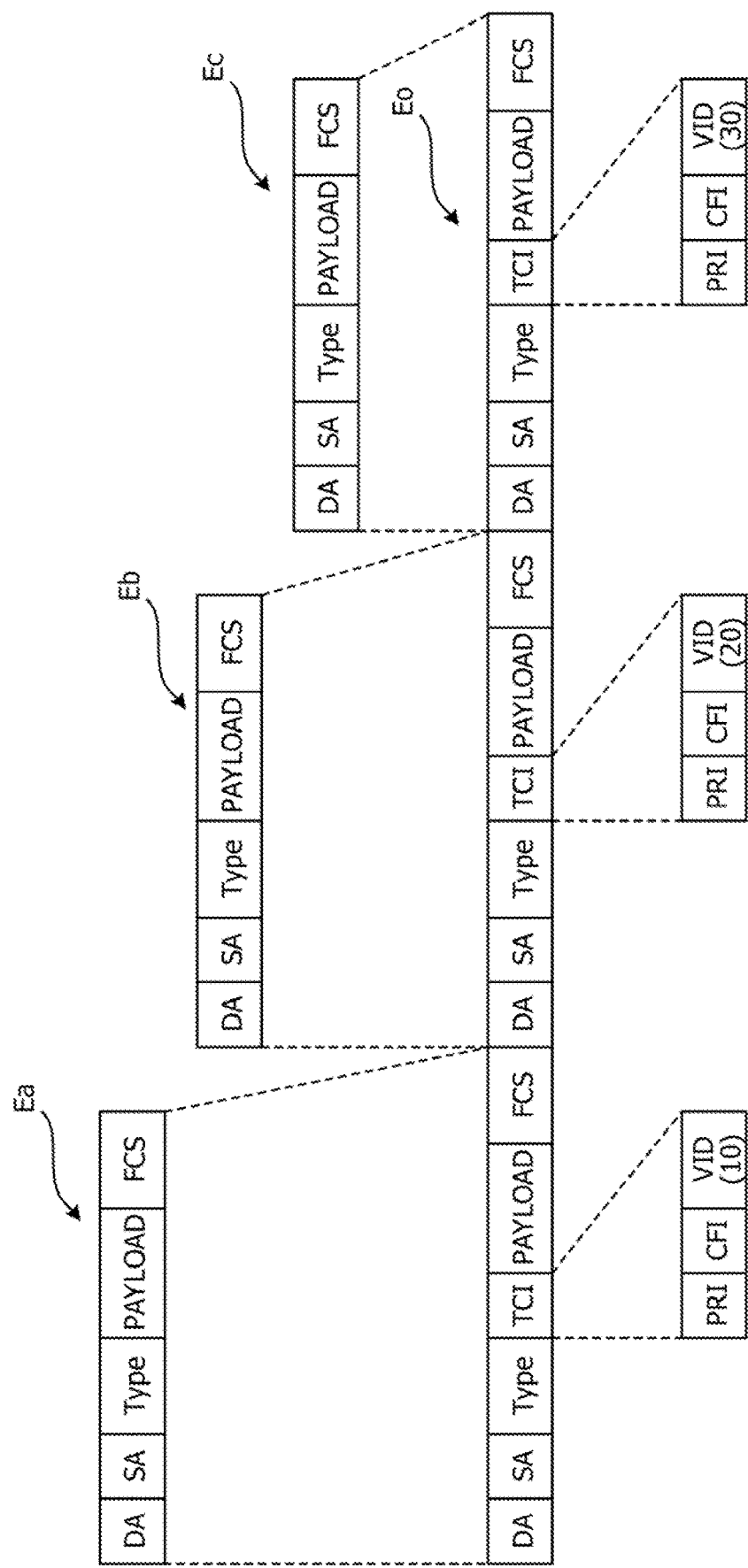
FIG. 8 is a diagram illustrating an example of time-division multiplexing.

FIG. 8 is a diagram illustrating an example of time-division multiplexing. In this example, it is assumed that the frame format of the data signals Ea to Ec is the Ethernet frame, but the frame format is not limited thereto.

The data signals Ea to Ec each have a destination address (DA), a source address (SA), a type, a payload, and a frame check sequence (FCS) area. The payloads store the supervisory control information on the wavelength-multiplexed signal light rays Sa to Sc.

The data signals Ea to Ec are multiplexed to the time-division multiplexed signal Eo. To each of the data signals Ea to Ec, a VLAN tag is given. The tag control information (TCI) of the VLAN tag Includes, for example, a priority area (PRI), a canonical format indicator (CFI), and a VID. As an example, the data signal Ea has a VID of "10," the data signal Eb has a VID of "20," and the data signal Ec has a VID of "30." The VID of the data signal Eb is an example of a first identifier, and the VIDs of the data signals Ea and Ec correspond to an example of a second Identifier.

With reference to FIG. 7 again, the SFP 47 converts the time-division multiplexed signal Eo to the control optical signal SCo having the center wavelength λm. The control optical signal SCo is input to the multiplexer 48. The multiplexer 48 multiplexes the control optical signal SCo to the wavelength-multiplexed signal light rays Sa to Sc input from the multiplexer 26 in the preceding stage, and outputs the thus obtained multiplexed light ray Smux to the transmission path 90. The SFP 47 is an example of a first electrical-optical conversion unit, and the multiplexer 48 is an example of the second multiplexing unit. The control optical signal SCo is an example of an optical signal.

With the configuration described above, the OSC light rays SCa and SCc are respectively demultiplexed from the wavelength-multiplexed signal light rays Sa and Sc by the demultiplexers 49a and 49c, to thereby be input to the multiplexer 48 through the SFPs 45a, 45c, and 47 and the L2SW unit 46. The OSC light rays SCa and SCc thus detour around the wavelength conversion units 24a and 24c, and the wavelength bands thereof are not converted.

Also in this example, an effect similar to that of the first embodiment is therefore obtained. The demultiplexers 49a and 49c, the SFPs 45a, 45c, and 47, the L2SW unit 46, and the multiplexer 48 correspond to an example of the first multiplexing/demultiplexing unit.

In this example, the L2SW unit 46 converts the data signals Ea to Ec to the single time-division multiplexed signal Eo through time-division multiplexing, and hence the OSC light rays SCa to SCc may be converted to the control optical signal SCo having the single wavelength λm to be transmitted. The bandwidths for the OSC light rays SCa to SCc are consequently smaller than those of the first and second embodiments.

In this example, the control optical signal SCo is generated from the OSC light rays SCa to SCc having the common wavelength λo, and hence an effect similar to that of the second embodiment is obtained. In this example, instead of the SFPs 45a to 45c and 47, a 10 gigabit small form factor pluggable (XFP) may be used.

Figure 9:
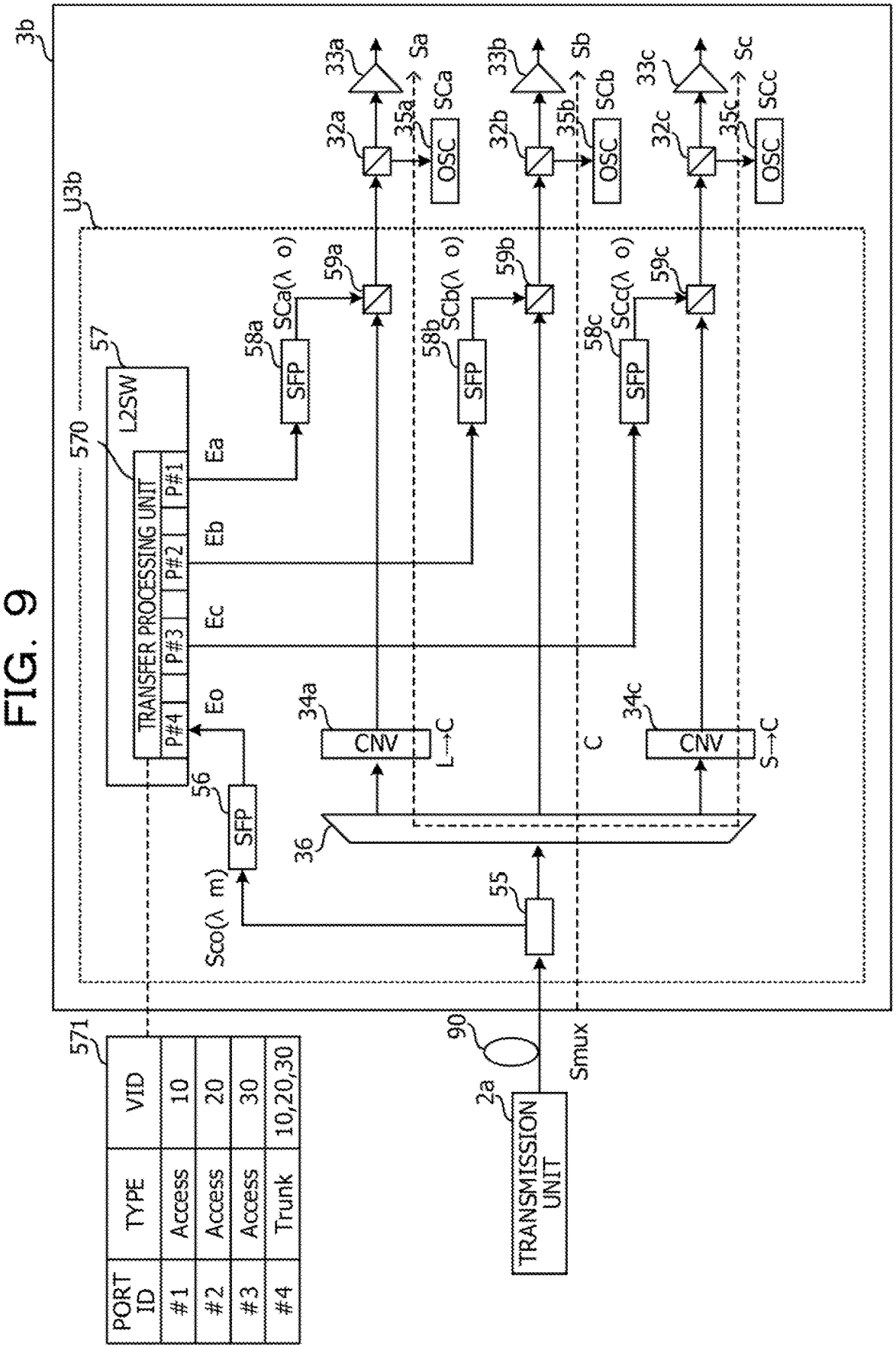
FIG. 9 is a configuration diagram illustrating a reception unit of the third embodiment.

FIG. 9 is a configuration diagram illustrating a reception unit of the third embodiment. In FIG. 9, configurations common to those in FIG. 1 are indicated by the same symbols, and description thereof is omitted.

In FIG. 9, the illustrations of the demultiplexers 31a to 31c, the receivers 30a to 30c, the control units 1a and 1b, the transmission unit 2b, and the reception unit 3a in FIG. 1 are omitted. The reception unit 3a has the same configuration as the reception unit 3b has.

The reception unit 3b includes an optical reception processing unit U3b instead of the optical reception processing unit Ub of the comparative example. The optical reception processing unit U3b includes demultiplexers 36 and 55, SFPs 56 and 58a to 58c, the wavelength conversion units 34a and 34c, multiplexers 59a to 59c, and an L2SW unit 57. The demultiplexer 55 is an optical splitter or an optical filter, for example, and the multiplexers 59a to 59c are optical couplers or optical filters, for example. The L2SW unit 57 is a circuit including hardware such as an FPGA or an ASIC.

The demultiplexer 55 is coupled between the transmission path 90 and the demultiplexer 36. The SFP 56 is coupled between the demultiplexer 55 and the L2SW unit 57. The multiplexer 59a is coupled between the wavelength conversion unit 34a and the demultiplexer 32a, and the multiplexer 59c is coupled between the wavelength conversion unit 34c and the demultiplexer 32c. The multiplexer 59b is coupled between the demultiplexer 36 and the demultiplexer 32b. The SFP 58a is coupled between the L2SW unit 57 and the multiplexer 59a, the SFP 58b is coupled between the L2SW unit 57 and the multiplexer 59b, and the SFP 58c is coupled between the L2SW unit 57 and the multiplexer 59c.

To the demultiplexer 55, the multiplexed light ray Smux Is input from the transmission path 90. The demultiplexer 55 demultiplexes the control optical signal SCo from the multiplexed light ray Smux and outputs the control optical signal SCo to the SFP 56. The SFP 56 converts the control optical signal SCo to the electrical time-division multiplexed signal Eo and outputs the electrical time-division multiplexed signal Eo to the L2SW unit 57. The demultiplexer 55 is an example of a second demultiplexing unit, and the SFP 56 is an example of a third optical-electrical conversion unit.

The L2SW unit 57 separates the data signals Ea to Ec from the time-division multiplexed signal Eo. The L2SW unit 57 includes the ports P #1 to P #4 and a transfer processing unit 570. The ports P #1 to P #4 are used for transmission/reception of data signals, for example, Ethernet signals. The transfer processing unit 570 exchanges data signals between the ports P #1 to P #4 based on a transfer table 571 in a memory, for example. The transfer table 571 is set from the control units 1a and 1b to the L2SW unit 57, for example. The settings of the transfer table 571 are similar to those of the transfer table 461, and description thereof is thus omitted.

To the port P #4, the time-division multiplexed signal Eo is input. The transfer processing unit 570 separates the data signals Ea to Ec from the time-division multiplexed signal Eo. The transfer processing unit 570 detects the VIDs of "10," "20," and "30" from the data signals Ea to Ec. Based on the transfer table 571, the transfer processing unit 570 outputs the data signal Ea having the VID of "10" from the port P #1 to the SFP 58a, the data signal Eb having the VID of "20" from the port P #2 to the SFP 58b, and the data signal Ec having the VID of "30" from the port P #3 to the SFP 58c.

The SFPs 58a to 58c convert the data signals Ea to Ec to the respective OSC light rays SCa to SCc having the common wavelength λo. The OSC light rays SCa to SCc are input from the SFPs 58a to 58c to the multiplexers 59a to 59c. The SFPs 58a and 58c correspond to an example of a second electrical-optical conversion unit, and the SFP 58b is an example of a third electrical-optical conversion unit.

The multiplexers 59a and 59c multiplex the OSC light rays SCa and SCc to the respective wavelength-multiplexed signal light rays Sa and Sc input from the wavelength conversion units 34a and 34c. The multiplexer 59b multiplexes the OSC light ray SCb to the wavelength-multiplexed signal light ray Sb input from the demultiplexer 36 in the preceding stage.

The OSC light rays SCa to SCc are input from the multiplexers 59a to 59c to the demultiplexers 32a to 32c, to thereby be demultiplexed from the respective wavelength-multiplexed signal light rays Sa to Sc. With this, the OSC reception units 35a to 35c receive the respective OSC light rays SCa to SCc. The multiplexers 59a and 59c correspond to an example of a fourth multiplexing unit, and the multiplexer 59b is an example of a fifth multiplexing unit.

In this way, the L2SW unit 57 outputs the data signals Ea to Ec to the respective SFPs 58a to 58c based on the VIDs. Thus, even when the OSC light rays SCa to SCc are accommodated in the control optical signal SCo having the single wavelength λm, the OSC reception units 35a to 35c may positively receive the OSC light rays SCa to SCc. The L2SW unit 57 is an example of a separation unit.

With the configuration described above, the OSC light rays SCa and SCc are demultiplexed from the wavelength-multiplexed signal light rays Sa and Sc by the demultiplexer 55, to thereby be input to the respective multiplexers 59a and 59c through the SFPs 58a, 58c, and 56 and the L2SW unit 57. The OSC light rays SCa and SCc thus detour around the wavelength conversion units 34a and 34c, and the wavelength bands thereof are not converted.

Also in this example, an effect similar to that of the first embodiment is therefore obtained. The demultiplexer 55, the SFPs 56, 58a, and 58c, the L2SW unit 57, and the multiplexers 59a and 59c correspond to an example of the second multiplexing/demultiplexing unit. Instead of the SFPs 56, 58a, and 58c, an XFP may be used.

Figure 10:
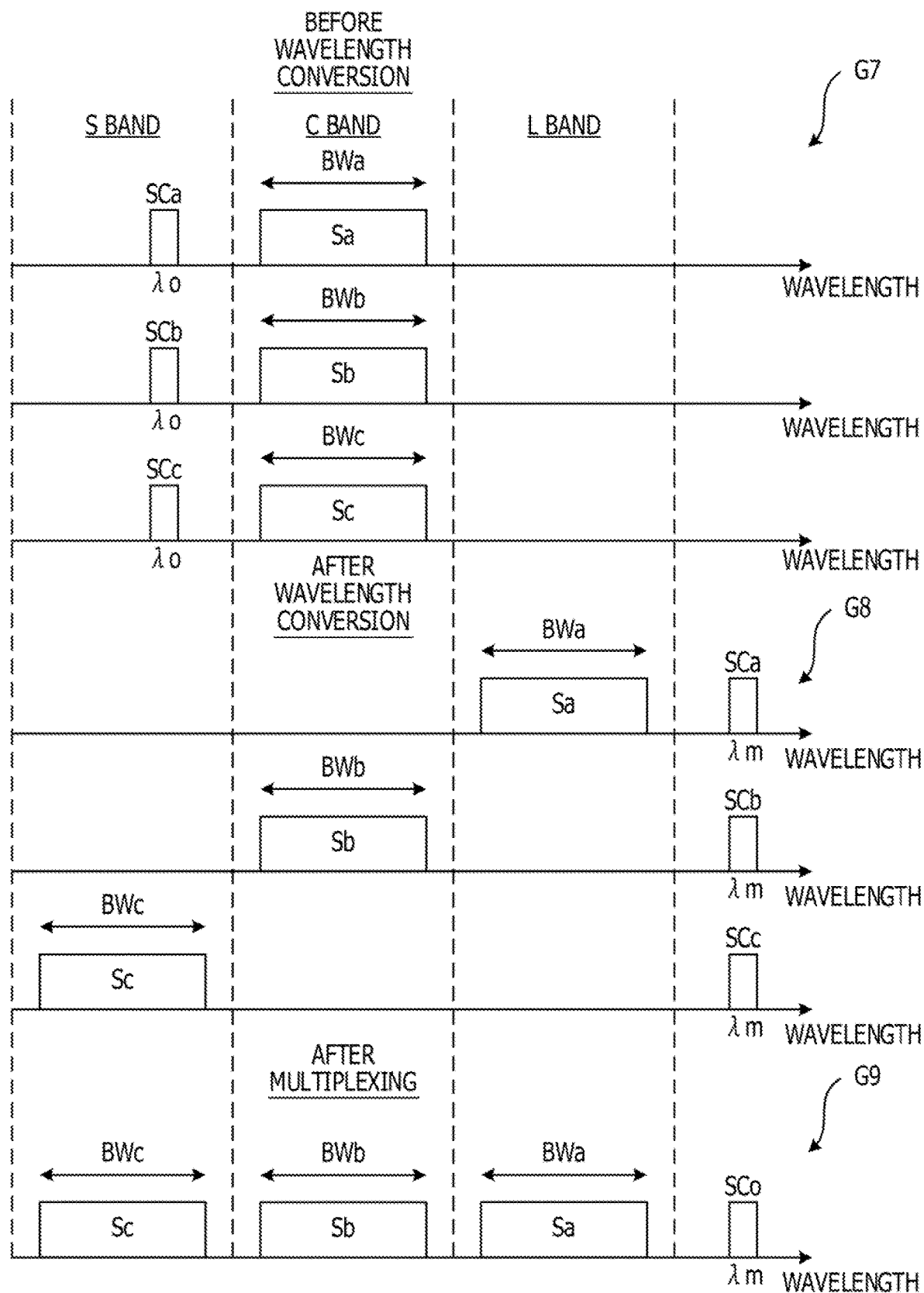
FIG. 10 is a diagram illustrating examples of wavelength bandwidths of wavelength-multiplexed signal light rays and OSC light lays before and after wavelength conversion and after multiplexing in a transmission unit.

FIG. 10 is a diagram illustrating examples of the wavelength bandwidths of the wavelength-multiplexed signal light rays Sa to Sc and the OSC light rays SCa to SCc before and after wavelength conversion and after multiplexing in the transmission unit 2a.

The symbol G7 indicates the wavelength bandwidths before wavelength conversion. The OSC light rays SCa to SCc each have the wavelength λo, which is a common wavelength. The wavelength λo is set to, for example, 1,510 (nm) that supports a general C-band transmission system. The wavelength λo is set in the wavelength band different from those of the wavelength-multiplexed signal light rays Sa to Sc, and hence the bandwidths BWa to BWc of the wavelength-multiplexed signal light rays Sa to Sc are wider than the bandwidths BWa to BWc of the comparative example in FIG. 3.

The symbol G8 indicates the wavelength bandwidths after wavelength conversion. The wavelength bands of the wavelength-multiplexed signal light rays Sa and Sc are converted from the C band to the L band or the S band. The wavelength λo of the OSC light rays SCa to SCc is converted to the common wavelength λm through time-division multiplexing. The wavelength λo before conversion and the wavelength λm after conversion may be the same wavelength outside the S band, the C band, and the L band.

The symbol G9 indicates the wavelength bandwidths after multiplexing. The OSC light rays SCa to SCc are multiplexed to the wavelength-multiplexed signal light rays Sa to Sc as the control optical signals SCo having the single wavelength λm. The bandwidths for the OSC light rays SCa to SCc are consequently smaller than those of the first and second embodiments.

In each embodiment described above, the wavelengths λa to λc of the OSC light rays SCa to SCc and the wavelength λm of the control optical signal SCo are outside the C band, the L band, and the S band, but the wavelengths are not limited thereto.

In a case where, for example, a U-band wavelength-multiplexed signal light ray obtained through wavelength multiplexing of another main signal light ray is transmitted to the transmission path 90, other than the wavelength-multiplexed signal light rays Sa to Sc obtained through wavelength multiplexing of the main signal light rays Da to Dc, for example, the wavelengths λa to λc of the OSC light rays SCa to SCc and the wavelength λm of the control optical signal SCo are set outside the C band, the L band, the S band, and the U band. In a case where, for example, the wavelength-multiplexed signal light rays Sa and Sb are transmitted to the transmission path 90, but the wavelength-multiplexed signal light ray Sc is not transmitted thereto, the wavelengths λa to λc of the OSC light rays SCa to SCc and the wavelength λm of the control optical signal SCo may be set in the S band.

For example, it is enough that the wavelengths λa to λc of the OSC light rays SCa to SCc and the wavelength λm of the control optical signal SCo are set in a wavelength band other than those of the wavelength-multiplexed signal light rays Sa to Sc of the main signal light rays to be transmitted to the transmission path 90.

The embodiments described above are preferred embodiments of the present invention. The present invention is, however, not limited to the embodiments, and various modifications may be made thereto within the range not departing from the gist of the present Invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the Invention.

What is claimed is:

1. A transmission system, comprising:
a first transmission device; and
a second transmission device that is coupled to the first transmission device,
the first transmission device including:
- an optical amplifier configured to amplify a first wavelength-multiplexed signal light in a first wavelength band;
- a multiplexer coupled to an output of the optical amplifier, the multiplexer being configured to multiplex the first wavelength-multiplexed signal light and a first supervisory control signal light ray that is a control signal for the first wavelength-multiplexed signal; and
- a transmission processing circuit coupled to an output of the multiplexer, the transmission processing circuit being configured to
- obtain the first wavelength-multiplexed signal light multiplexed with the first supervisory control signal light ray,
- demultiplex the first supervisory control signal light ray from the obtained first wavelength-multiplexed signal light to yield the demultiplexed first wavelength-multiplexed signal light from which the first supervisory control signal light ray has been removed,
- convert, to a second wavelength band different from the first wavelength band, the demultiplexed first wavelength-multiplexed signal light, and
- transmit a wavelength-multiplexed signal to the second transmission device, the wavelength-multiplexed signal being obtained by multiplexing a second wavelength-multiplexed signal in the first wavelength band, a second supervisory control signal light ray $_2$ that is a control signal for the second wavelength-multiplexed signal, the demultiplexed first wavelength-multiplexed signal in the second wavelength band, and the first supervisory control signal light ray demultiplexed from the obtained first wavelength-multiplexed signal light in the first wavelength band, the second transmission device including:
- a reception processing circuit configured to
- receive the wavelength-multiplexed signal,
- demultiplex, from the received wavelength-multiplexed, the first wavelength-multiplexed signal in the second wavelength band, the second wavelength-multiplexed signal in the first wavelength band, the first supervisory control signal light ray, and the second supervisory control signal light ray, and
- convert, from the second wavelength band to the first wavelength band, the demultiplexed first wavelength-multiplexed signal, and
- multiplex the demultiplexed first wavelength-multiplexed signal in the first wavelength band and the demultiplexed first supervisory control signal light ray; and
- a demultiplexer coupled to an output of the reception processing circuit, the demultiplexer being configured to demultiplex the first supervisory control signal light ray from the first wavelength-multiplexed signal output from the reception processing circuit, wherein the first supervisory control signal light ray and the second supervisory control signal light ray each have a wavelength in a wavelength band different from the first wavelength band and the second wavelength band.

2. The transmission system according to claim 1, wherein the first transmission device is configured to convert, before the multiplexing of the first supervisory control signal light ray and the first wavelength-multiplexed signal in the second wavelength band, a wavelength of the first supervisory control signal $_3$light ray to a wavelength different from a wavelength of the second supervisory control signal light ray.

3. The transmission system according to claim 1, wherein the first transmission device is configured to:
multiplex a third supervisory control signal light ray to a third wavelength-multiplexed signal in the first wavelength band;
demultiplex, before converting the third wavelength-multiplexed signal from the first wavelength band to the second wavelength band, the third second supervisory control signal light ray from the third wavelength-multiplexed signal in the first wavelength band to yield the demultiplexed third wavelength-multiplexed signal light from which the third supervisory control signal light ray has been removed; and
convert, to the second wavelength band different from the first wavelength band, the demultiplexed third wavelength-multiplexed signal light, and
the transmitting of the wavelength-multiplexed signal is configured to transmit the wavelength-multiplexed signal obtained through multiplexing of the demultiplexed first wavelength-multiplexed signal in the second wavelength band, the second wavelength-multiplexed signal in the first wavelength band, the first supervisory control signal light ray, the second supervisory control signal light ray, the demultiplexed third wavelength-multiplexed signal in the second wavelength band, and the third supervisory control signal light ray.

4. A transmission device comprising:
an optical amplifier configured to amplify a first wavelength-multiplexed signal light in a first wavelength band;
a multiplexer coupled to an output of the optical amplifier, the multiplexer being configured to multiplex the first wavelength-multiplexed signal light and a first supervisory control signal light ray that is a control signal for the first wavelength-multiplexed signal; and
a transmission processing circuit coupled to an output of the multiplexer, the transmission processing circuit being configured to
obtain the first wavelength-multiplexed signal light multiplexed with the first supervisory control signal light ray,
demultiplex the first supervisory control signal light ray from the obtained first wavelength-multiplexed signal light to yield the demultiplexed first wavelength-multiplexed signal light from which the first supervisory control signal light ray has been removed,
convert, to a second wavelength band different from the first wavelength band,
the demultiplexed first wavelength-multiplexed signal light, and
transmit a wavelength-multiplexed signal to another transmission device, the wavelength-multiplexed signal being obtained by multiplexing a second wavelength-multiplexed signal in the first wavelength band, a second supervisory control signal light ray that is a control signal for the second wavelength-multiplexed signal, the demultiplexed first wavelength-multiplexed signal in the second wavelength band, and the first supervisory control signal light ray demultiplexed from the obtained first wavelength-multiplexed signal light in the first wavelength band, the another transmission device including:
a reception processing circuit configured to
receive the wavelength-multiplexed signal,
demultiplex, from the received wavelength-multiplexed, the first wavelength-multiplexed signal in the second wavelength band, the second wavelength-multiplexed signal in the first wavelength band, the first supervisory control signal light ray, and the second supervisory control signal light ray, and
convert, from the second wavelength band to the first wavelength band, the demultiplexed first wavelength-multiplexed signal, and
multiplex the demultiplexed first wavelength-multiplexed signal in the first wavelength band and the demultiplexed first supervisory control signal light ray; and
a demultiplexer coupled to an output of the reception processing circuit, the demultiplexer being configured to demultiplex the first supervisory control signal light ray from the first wavelength-multiplexed signal output from the reception processing circuit, wherein
the first supervisory control signal light ray and the second supervisory control signal light ray each have a wavelength in a wavelength band different from the first wavelength band and the second wavelength band.

5. The transmission device according to claim 4, further comprising:
a second multiplexer configured to multiplex a third supervisory control signal light ray to a third wavelength-multiplexed signal in the first wavelength band,
wherein the transmission processing circuit is coupled to an output of the second multiplexer, the transmission processing circuit being configured to:
obtain the third wavelength-multiplexed signal light multiplexed with the third supervisory control signal light ray,
demultiplex the third supervisory control signal light ray from the obtained third wavelength-multiplexed signal light to yield the demultiplexed third wavelength-multiplexed signal light from which the third supervisory control signal light ray has been removed, and
convert, to the second wavelength band different from the first wavelength band, the demultiplexed third wavelength-multiplexed signal light,
the transmitting of the wavelength-multiplexed signal is configured to transmit the wavelength-multiplexed signal obtained through multiplexing of the demultiplexed first wavelength-multiplexed signal in the second wavelength band, the second wavelength-multiplexed signal in the first wavelength band, the first supervisory control signal light ray, the second supervisory control signal light ray, the demultiplexed third wavelength-multiplexed signal in the second wavelength band, and the third supervisory control signal light ray.

6. The transmission device according to claim 4, further comprising:
a wavelength converter configured to convert, before multiplexing the first supervisory control signal light ray and the second supervisory control signal light ray, a wavelength of the first supervisory control signal light ray to a wavelength different from a wavelength of the second supervisory control signal light ray.

7. A transmission method comprising:
amplifying a first wavelength-multiplexed signal light in a first wavelength band;
multiplexing the first wavelength-multiplexed signal light and a first supervisory control signal light ray that is a control signal for the first wavelength-multiplexed signal;
demultiplexing the first supervisory control signal light ray from the first wavelength-multiplexed signal light multiplexed with the first supervisory control signal light ray to yield the demultiplexed first wavelength-multiplexed signal light from which the first supervisory control signal light ray has been removed;
converting, to a second wavelength band different from the first wavelength band, the demultiplexed first wavelength-multiplexed signal light; and
transmitting a wavelength-multiplexed signal to another transmission device, the wavelength-multiplexed signal being obtained by multiplexing a second wavelength-multiplexed signal in the first wavelength band, a second supervisory control signal light ray that is a control signal for the second wavelength-multiplexed signal, the demultiplexed first wavelength-multiplexed signal in the second wavelength band, and the first supervisory control signal light ray demultiplexed from the obtained first wavelength-multiplexed signal light in the first wavelength band, the another transmission device including:
a reception processing circuit configured to
receive the wavelength-multiplexed signal,
demultiplex, from the received wavelength-multiplexed, the first wavelength-multiplexed signal in the second wavelength band, the second wavelength-multiplexed signal in the first wavelength band, the first supervisory control signal light ray, and the second supervisory control signal light ray, and
convert, from the second wavelength band to the first wavelength band, the demultiplexed first wavelength-multiplexed signal, and
multiplex the demultiplexed first wavelength-multiplexed signal in the first wavelength band and the demultiplexed first supervisory control signal light ray; and
a demultiplexer coupled to an output of the reception processing circuit, the demultiplexer being configured to demultiplex the first supervisory control signal light ray from the first wavelength-multiplexed signal output from the reception processing circuit, wherein
the first supervisory control signal light ray and the second supervisory control signal light ray each have a wavelength in a wavelength band different from the first wavelength band and the second wavelength band.

8. The transmission method according to claim 7, further comprising:
converting, before multiplexing the first supervisory control signal light ray and the second supervisory control signal light ray, a wavelength of the first supervisory control signal light ray to a wavelength different from a wavelength of the second supervisory control signal light ray.

* * * * *